US012568296B2

(12) United States Patent (10) Patent No.: US 12,568,296 B2
Nakamura et al. (45) Date of Patent: Mar. 3, 2026

(54) VEHICULAR CAMERA

(71) Applicant: Panasonic Automotive Systems Co., Ltd., Kanagawa (JP)

(72) Inventors: Ken Nakamura, Kanagawa (JP); Koyo Usami, Kanagawa (JP); Masayuki Yoshie, Aichi (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 35 days.

(21) Appl. No.: 18/784,499

(22) Filed: Jul. 25, 2024

(65) Prior Publication Data

US 2025/0039526 A1 Jan. 30, 2025

(51) Int. Cl.
| | |
|---|---|
| *H04N 23/55* | (2023.01) |
| *B60R 11/04* | (2006.01) |
| *H04N 23/51* | (2023.01) |
| *H04N 23/54* | (2023.01) |

(52) U.S. Cl.
CPC ............. *H04N 23/55* (2023.01); *H04N 23/51* (2023.01); *H04N 23/54* (2023.01); *B60R 11/04* (2013.01)

(58) Field of Classification Search
CPC ........ H04N 23/57; H04N 23/55; H04N 23/51; H04N 23/54; G60R 11/04
USPC ....................................................... 348/340
See application file for complete search history.

(56) References Cited

U.S. PATENT DOCUMENTS

| | | | | |
|---|---|---|---|---|
| 7,221,524 B2 * | 5/2007 | Ye | .......................... | H04N 23/55 |
| | | | | 359/822 |
| 7,230,777 B2 * | 6/2007 | Ye | ........................... | G02B 9/16 |
| | | | | 359/701 |
| 9,620,900 B2 * | 4/2017 | Yanase | ............... | H01R 13/6315 |
| 9,905,968 B2 * | 2/2018 | Yanase | ............... | H01R 13/6315 |
| 10,466,501 B2 * | 11/2019 | Bakin | .................... | H04N 23/55 |
| 2005/0168846 A1 * | 8/2005 | Ye | .......................... | H04N 23/55 |
| | | | | 359/819 |
| 2006/0221469 A1 * | 10/2006 | Ye | .......................... | G02B 7/021 |
| | | | | 359/811 |
| 2016/0062110 A1 * | 3/2016 | Kashima | ............... | G02B 7/022 |
| | | | | 359/513 |
| 2016/0211614 A1 | 7/2016 | Yanase et al. | | |

(Continued)

FOREIGN PATENT DOCUMENTS

| | | |
|---|---|---|
| JP | 6041107 B2 | 12/2016 |
| JP | 6183626 B2 | 8/2017 |
| JP | 6712376 B1 | 6/2020 |

*Primary Examiner* — Pritham D Prabhakher

(74) *Attorney, Agent, or Firm* — Seed Intellectual Property Law Group LLP

(57) ABSTRACT

A vehicular camera includes a lens unit including a first cylindrical portion, lens disposed inside the first cylindrical portion, and a flange portion disposed outside the first cylindrical portion to extend outward with respect to an optical axis of the lens, a circuit board, an image capturing element disposed on the optical axis of the lens, a housing including a second tubular portion, and accommodating the circuit board and the image capturing element inside the second tubular portion, and a ring member welded to the flange portion of the lens unit and the second tubular portion of the housing. The welding rib includes a first portion and a second portion, and a first height at which the first portion protrudes from the flange portion along an optical axis direction is different from a second height at which the second portion.

12 Claims, 26 Drawing Sheets

(56)         References Cited

U.S. PATENT DOCUMENTS

2017/0047683  A1      2/2017  Yanase et al.
2017/0343831  A1*   11/2017  Bakin  ................. G02B 27/0012
2023/0038371  A1*    2/2023  Zhang  ................... G02B 7/003

* cited by examiner

FIG. 1A
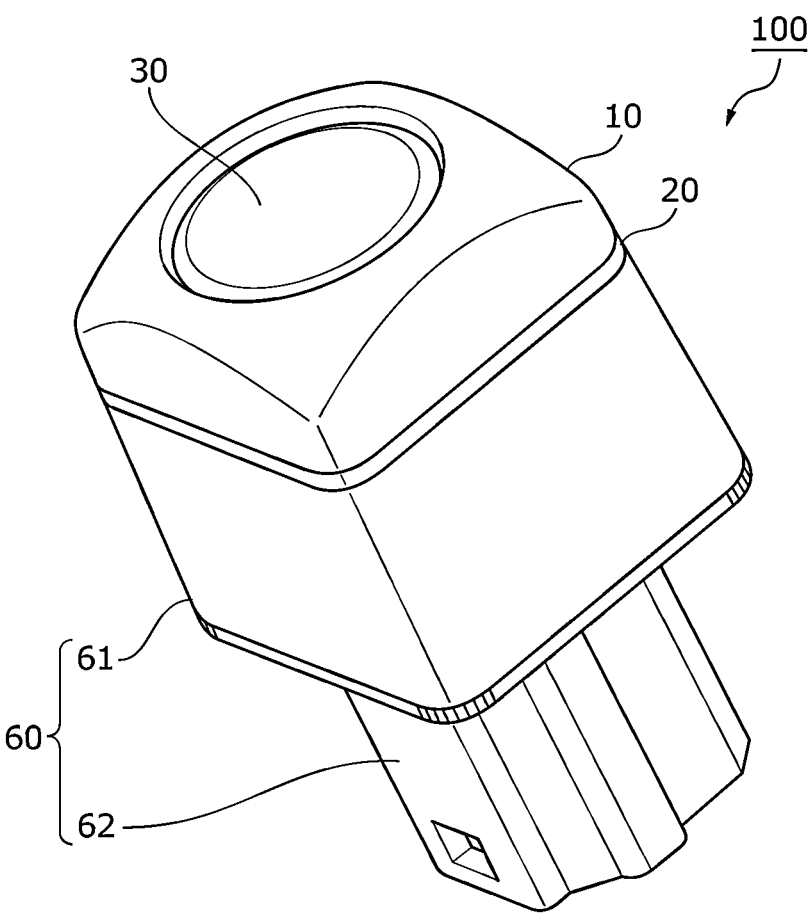
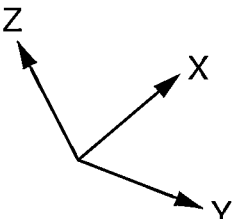

FIG. 2
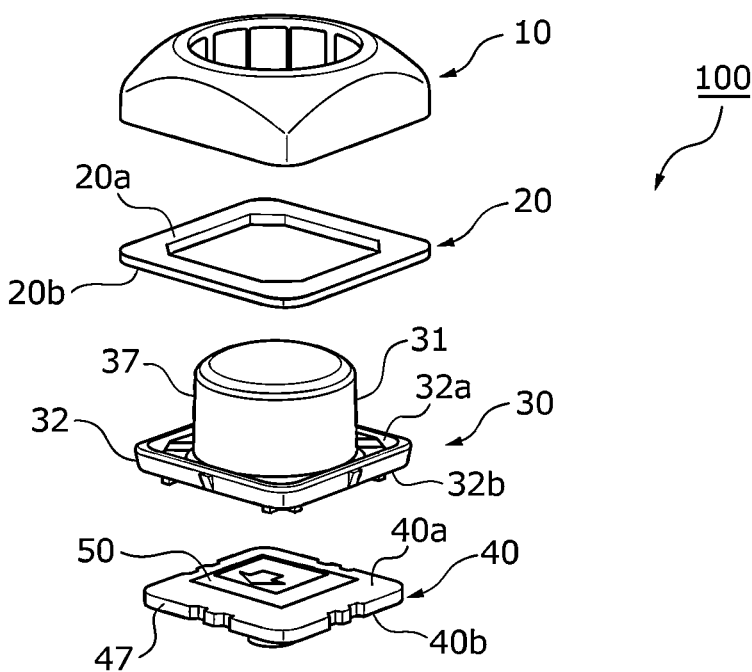
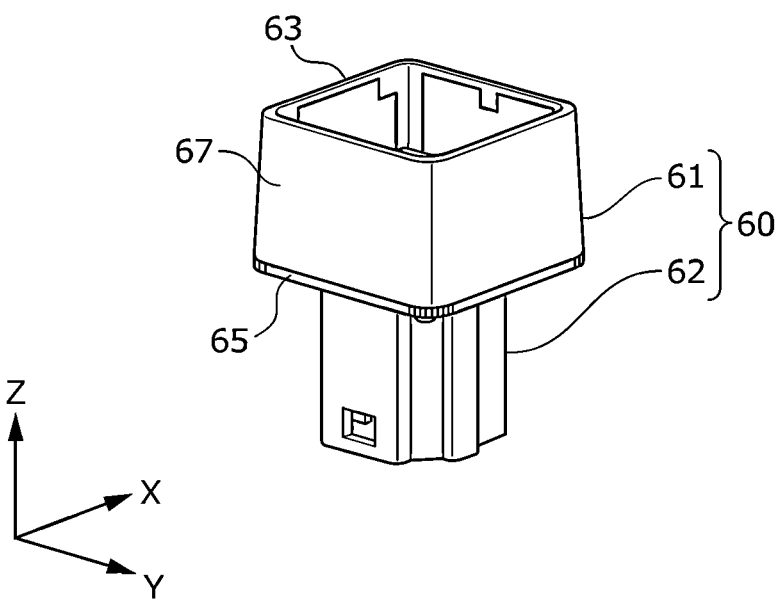

*FIG. 5*

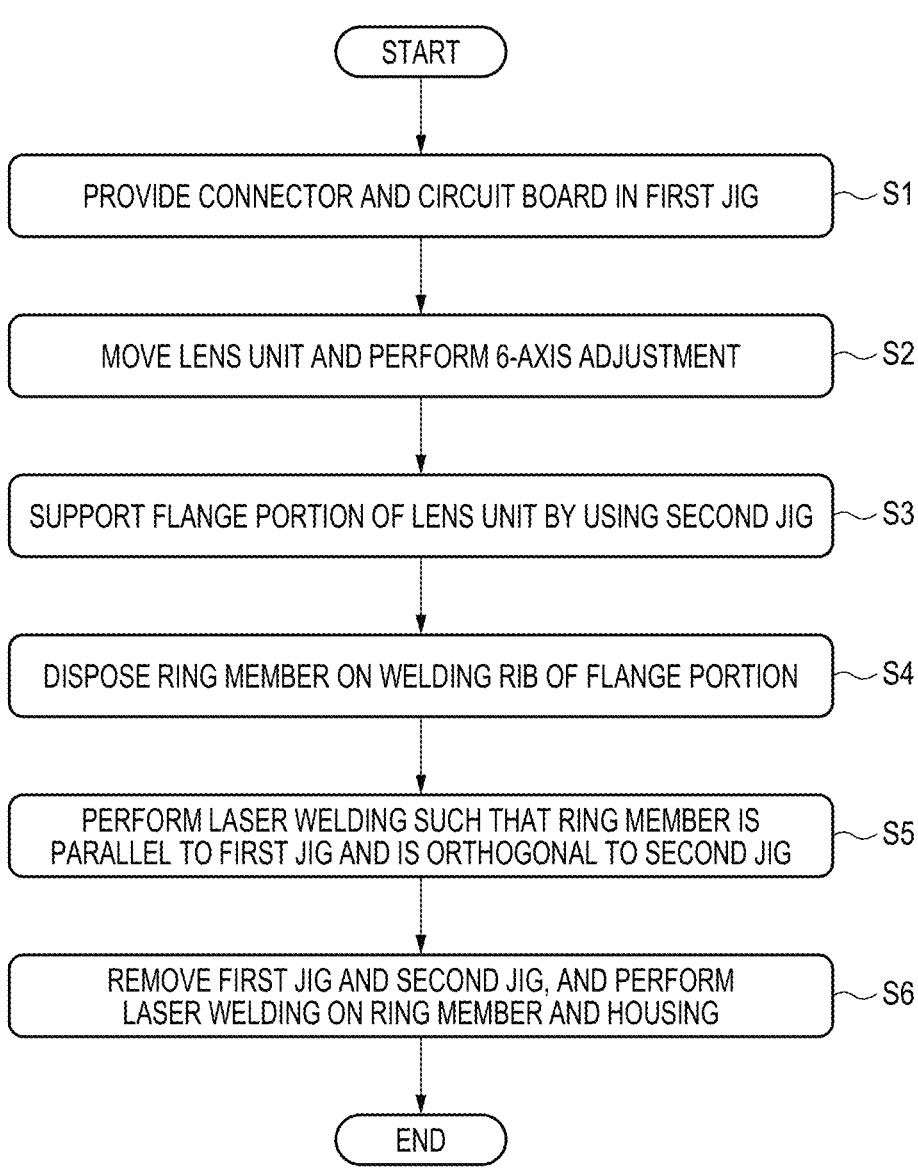

START

PROVIDE CONNECTOR AND CIRCUIT BOARD IN FIRST JIG — S1

MOVE LENS UNIT AND PERFORM 6-AXIS ADJUSTMENT — S2

SUPPORT FLANGE PORTION OF LENS UNIT BY USING SECOND JIG — S3

DISPOSE RING MEMBER ON WELDING RIB OF FLANGE PORTION — S4

PERFORM LASER WELDING SUCH THAT RING MEMBER IS PARALLEL TO FIRST JIG AND IS ORTHOGONAL TO SECOND JIG — S5

REMOVE FIRST JIG AND SECOND JIG, AND PERFORM LASER WELDING ON RING MEMBER AND HOUSING — S6

END

*FIG. 6*
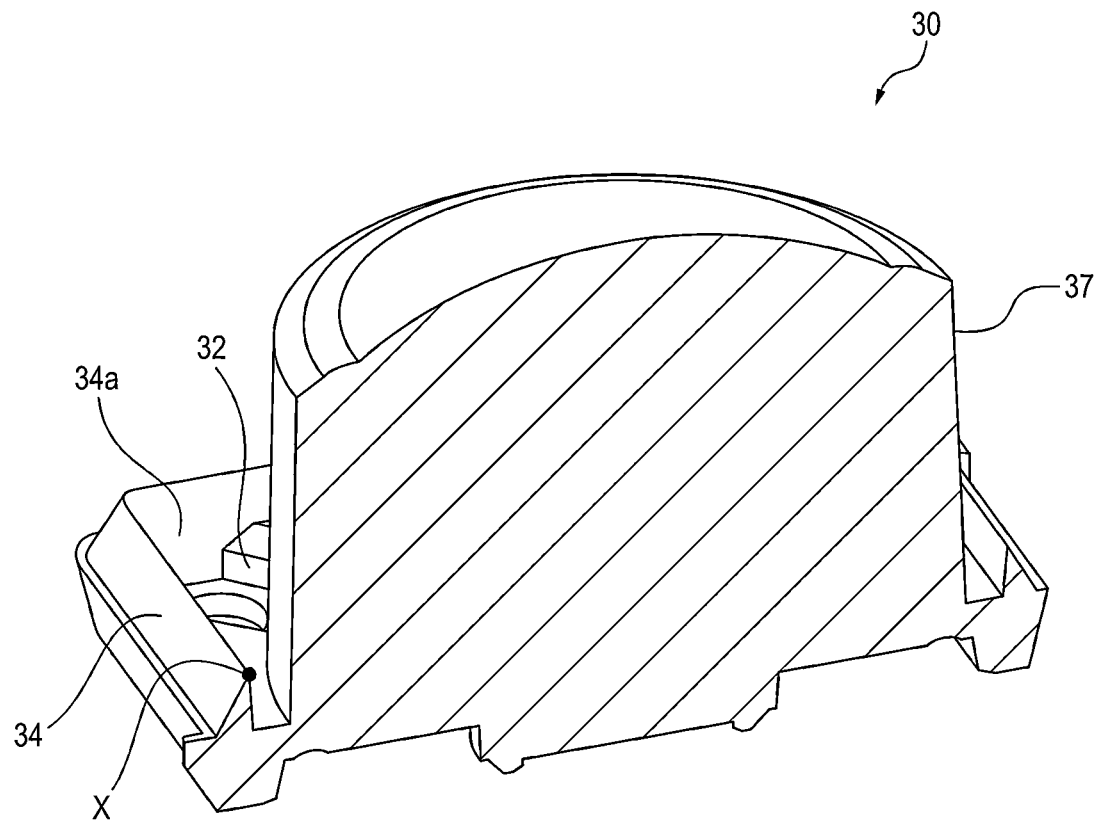
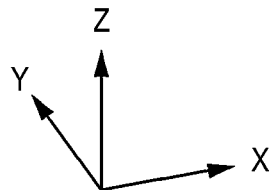

COLUMN
DIRECTION

ROW
DIRECTION

VEHICULAR CAMERA

CROSS-REFERENCE TO RELATED APPLICATIONS

This application is based on and claims priority under 35 USC 119 from Japanese Patent Application No. 2023-121956 filed on Jul. 26, 2023, the entire content of which is incorporated herein by reference.

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active as disclosed in Japanese Patent No. 6041107, Japanese Patent No. 6183626, and Japanese Patent No. 6712376.

A level of demands related to the safety, the autonomous driving functions, and the like, which are required for a vehicle, continues to increase, and further improvements in performance and the like are also required for the vehicular camera.

The present disclosure relates to a technique of providing a new vehicular camera capable of restraining deterioration of transmission characteristics of a connector.

SUMMARY

A vehicular camera, includes a lens unit including a first cylindrical portion having a first cylindrical shape, at least one lens disposed inside the first cylindrical portion, and a flange portion disposed outside the first cylindrical portion to extend outward with respect to an optical axis of the at least one lens over an entire periphery around the optical axis, a circuit board including a first surface and a second surface opposite to the first surface, an image capturing element disposed on the optical axis of the lens and on the first surface of the circuit board, a housing including a second tubular portion having a second tubular shape along the optical axis, and at least accommodating the circuit board and the image capturing element inside the second tubular portion, and a ring member having a flat plate shape and predetermined light transmissivity and welded to the flange portion of the lens unit and the second tubular portion of the housing. The ring member has a third surface and a fourth surface opposite to the third surface and facing the flange portion of the lens unit. The flange portion of the lens unit includes a welding rib protruding toward the fourth surface of the ring member and disposed over the entire periphery around the optical axis. The fourth surface of the ring member is welded to the welding rib and is welded to an end surface of the second tubular portion of the housing. The welding rib includes a first portion and a second portion different from the first portion. A first height at which the first portion protrudes from the flange portion along an optical axis direction is different from a second height at which the second portion protrudes from the flange portion along the optical axis direction.

According to the present disclosure, since the connector disposed over the inner side and the outer side of the housing is connected to the circuit board without being inclined, it is possible to restrain the deterioration of the transmission characteristics of the connector.

BRIEF DESCRIPTION OF DRAWINGS

FIG. 1A is a top perspective view of a vehicular camera according to an embodiment;

FIG. 2 is an exploded perspective view of the vehicular camera according to the embodiment;

FIG. 5 is a flowchart illustrating a procedure of the manufacturing method of the vehicular camera according to the embodiment;

FIG. 6 is a perspective view in which a cross section of a lens unit before assembly of the vehicular camera is exposed;

FIG. 14 is a block diagram illustrating the configuration of the vehicular camera according to the another embodiment;

DESCRIPTION OF EMBODIMENTS

Hereinafter, embodiments that specifically disclose a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and to facilitate understanding of a person skilled in the art. It should be noted that the accompanying drawings and the following description are provided for a person skilled in the art to sufficiently understand the present disclosure, and are not intended to limit the subject matter described in the claims.

Figure 1B:
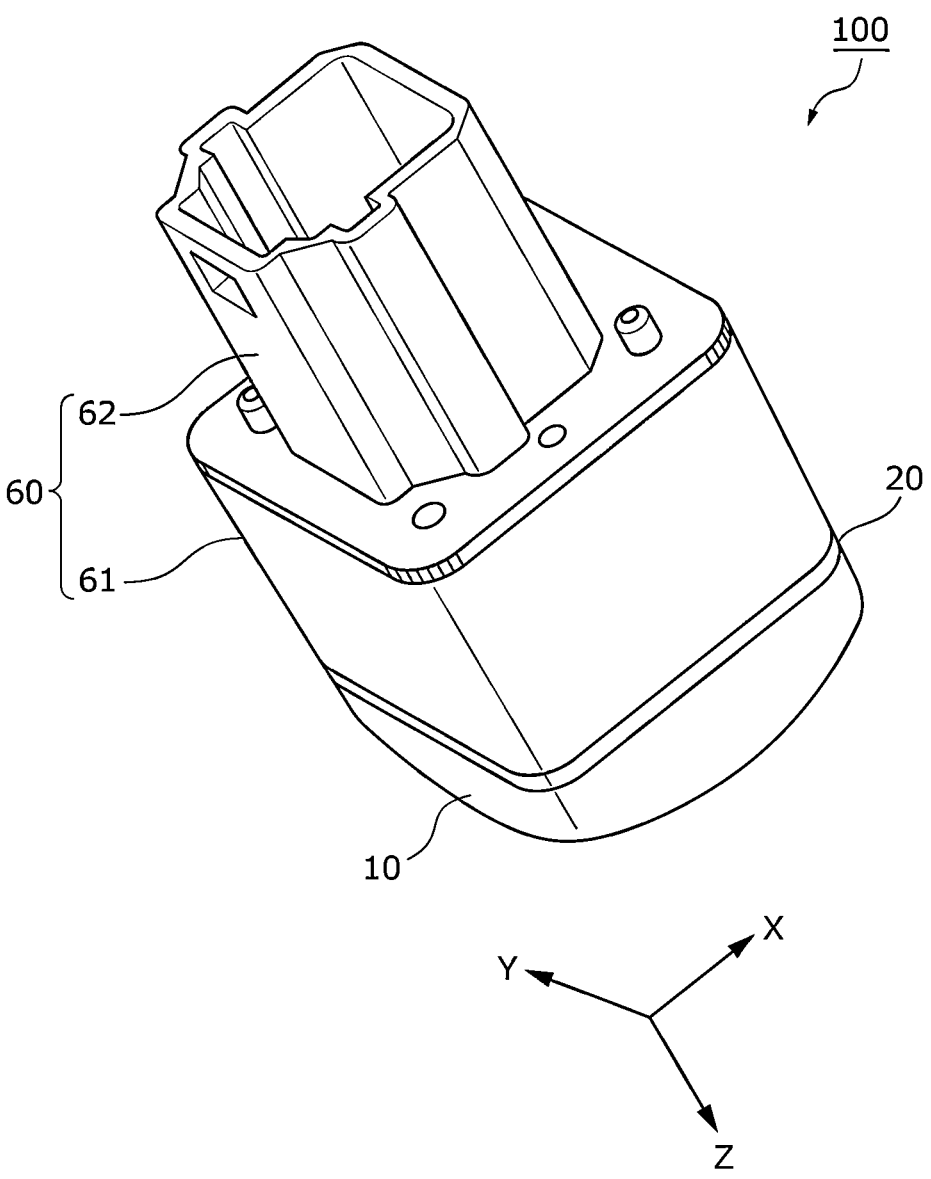
FIG. 1B is a bottom perspective view of the vehicular camera according to the embodiment.

FIG. 1A is a top perspective view of a vehicular camera 100 according to an embodiment. FIG. 1B is a bottom perspective view of the vehicular camera 100 according to the embodiment. FIG. 2 is an exploded perspective view of the vehicular camera 100 according to the embodiment. A Z axis along an optical axis of a lens of a lens unit 30 in the vehicular camera 100 (in other words, an axis along a height direction of the vehicular camera 100), an X axis that is a first axis of two axes orthogonal to the Z axis, and a Y axis that is a second axis of the two axes orthogonal to the Z axis and is also orthogonal to the X axis are defined and used in the following description.

The vehicular camera 100 according to the present embodiment includes a cap 10, a ring member 20, the lens unit 30, a circuit board 40, an image capturing element 50, and a housing 60. The cap 10 is a member that is attached to the ring member 20 and protects the lens unit 30.

The ring member 20 is implemented by a rectangular annular member having a flat plate shape in a planar view (A line of sight when the vehicular camera 100 is viewed along a cross section orthogonal to the Z axis, the same applies hereinafter.), and is welded to the lens unit 30 and the housing 60 by laser welding. The ring member 20 includes a third surface 20a and a fourth surface 20b that is opposite to the third surface 20a and faces a flange portion 32 of the lens unit 30. An inner peripheral surface of the ring member 20 faces, in an XY plane direction, an outer peripheral surface of a first cylindrical portion 37 that constitutes a lens barrel 31 of the lens unit 30. An inner diameter of the ring member 20 has a length that allows the first cylindrical portion 37 (the lens barrel 31) of the lens unit 30 to be inserted.

The ring member 20 is formed of a first resin having predetermined light transmissivity. The first resin is made of a material containing a light transmissive resin. For example, the light transmissive resin includes a polyester resin, a polyolefin resin, a polyamide resin, a vinyl chloride resin, and a fluorine resin. As the polyester resin, polybutylene terephthalate (PBT), polyethylene terephthalate (PET), or the like can be used. As the polyolefin resin, polyethylene, polypropylene, or the like can be used. One type of light transmissive resin or a plurality of types of light transmissive resins may be used. In addition, a coloring material, a filler, or both may be contained in a main light transmissive resin as long as a transmission performance of a certain level or more can be achieved.

Although the ring member 20 has a flat rectangular annular shape in the present embodiment, the shape is not limited thereto, and a welded portion has a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The lens unit 30 includes the first cylindrical portion 37 that constitutes the lens barrel 31 having a cylindrical shape and has a first cylindrical shape, and at least one lens (not shown) disposed inside the first cylindrical portion 37. The first cylindrical portion 37 has a cylindrical shape, and holds a lens group including, for example, a plurality of lenses inside the first cylindrical portion 37. The respective lenses in the lens group are arranged in a state in which respective optical axes (axes extending in an up-down direction of FIG. 2 and along the Z axis) are aligned with each other, and constitute the lens group used for capturing images of the inside and outside of a vehicle body of a vehicle.

The lens unit 30 has the flange-shaped flange portion 32 protruding from the outer peripheral surface toward the outside of the first cylindrical portion 37. The flange portion 32 is disposed outside the first cylindrical portion 37 to extend outward with respect to the optical axis of at least one of the lenses over an entire periphery around the optical axis. A cross section of the flange portion 32 along a radial direction has a quadrilateral shape. The flange portion 32 is located in the vicinity of an opening of an internal space of the housing 60 to be described later, and protrudes toward an inner peripheral surface of the housing 60. At least a part of the flange portion 32 is joined to the housing 60 via the ring member 20. A relation between the lens unit 30 and the housing 60 will be described later.

In addition, the flange portion 32 is disposed inside a large-diameter tubular portion 61 to be described later of the housing 60 in the radial direction orthogonal to the optical axis, and includes a ring-shaped first flange surface 32a facing the ring member 20 and a ring-shaped second flange surface 32b opposite to the first flange surface 32a.

At least the second flange surface 32b of the flange portion 32 in the lens unit 30 is formed of a second resin having a first light absorptivity. The second resin is made of a material containing a light absorbing resin. As the light absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of light absorbing resin or a plurality of types of light absorbing resins may be used. A main light absorbing resin may contain an absorbent that absorbs laser light, a coloring material, or both.

Since the second flange surface 32b of the flange portion 32 is made of the second resin, transmission of light into the internal space can be reduced. That is, the transmission of light from the outside of the vehicular camera 100 to the inside of the vehicular camera 100 can be reduced. Therefore, image quality deterioration of a captured image due to halation or the like of the image capturing element 50 caused by transmitted light can be prevented. The entire flange portion 32 or the entire lens unit 30 may be formed of the second resin.

The circuit board 40 is disposed in the internal space of the housing 60, and includes a first surface 40a and a second surface 40b opposite to the first surface 40a. The circuit board 40 includes an end surface 47 between the first surface 40a and the second surface 40b. However, two or more circuit boards may be provided.

The image capturing element 50 is disposed in the internal space of the housing 60 together with the circuit board 40, receives light transmitted through the lens unit 30, and captures an optical image of a subject by photoelectric conversion based on the received light to generate a captured image of the subject. The image capturing element 50 is disposed on the optical axis of the at least one lens of the lens unit 30. The image capturing element 50 is mounted on the first surface 40a of the circuit board 40, and light from the outside of the subject and the like can be easily guided to the image capturing element 50.

The housing 60 is a tubular member having the internal space, and directly, in some cases, indirectly supports the lens unit 30 and accommodates at least the circuit board 40 and the image capturing element 50. The housing 60 includes the large-diameter tubular portion 61 having a second tubular shape along the optical axis and a small-diameter tubular portion 62 having a third tubular shape along the optical axis. The large-diameter tubular portion 61 constituting a second tubular portion has a larger cross-sectional area than the small-diameter tubular portion 62 constituting a third tubular portion in the XY plane direction, and has a rectangular cross section. The large-diameter tubular portion 61 accommodates the circuit board 40 and the image capturing element 50 therein. The small-diameter tubular portion 62 mainly accommodates a connector 80 that secures electrical connection with the outside of the vehicular camera 100 (see the following description). The large-diameter tubular portion 61 and the small-diameter tubular portion 62 may be integrally formed by using a resin to be described later, and the large-diameter tubular portion 61 and the small-diameter tubular portion 62 prepared individually in advance may be joined by a method such as welding or screwing. Although the housing 60 has a rectangular tubular shape in the present embodiment, the shape is not limited thereto, and may be a polygonal tubular shape other than the rectangular tubular shape, a circular or elliptical tubular shape, or another tubular shape.

An end surface 63 of the large-diameter tubular portion 61 to be described later of the housing 60 is formed of a third resin having a second light absorptivity. The third resin is made of a material containing a light absorbing resin. As the light absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of light absorbing resin or a plurality of types of light absorbing resins may be used. A main light absorbing resin may contain an absorbent that absorbs laser light, a coloring material, or both. The second light absorptivity may be the same as or different from the first light absorptivity.

Since the housing 60 is made of the third resin (that is, the material containing a light absorbing resin), the transmission of light into the internal space of the housing 60 can be reduced. That is, the transmission of light from the outside of the vehicular camera 100 to the inside of the vehicular camera 100 can be reduced. Therefore, image quality deterioration of a captured image due to halation or the like of the image capturing element 50 caused by transmitted light can be prevented. The entire large-diameter tubular portion 61 or the entire housing 60 may be formed of the third resin.

The ring member 20 is welded to the first flange surface 32a of the flange portion 32 of the lens unit 30 and the end surface 63 of the housing 60 by the laser welding. Hereinafter, a method of assembling the vehicular camera 100, which includes the laser welding of the ring member 20, will be described.

Figure 3:
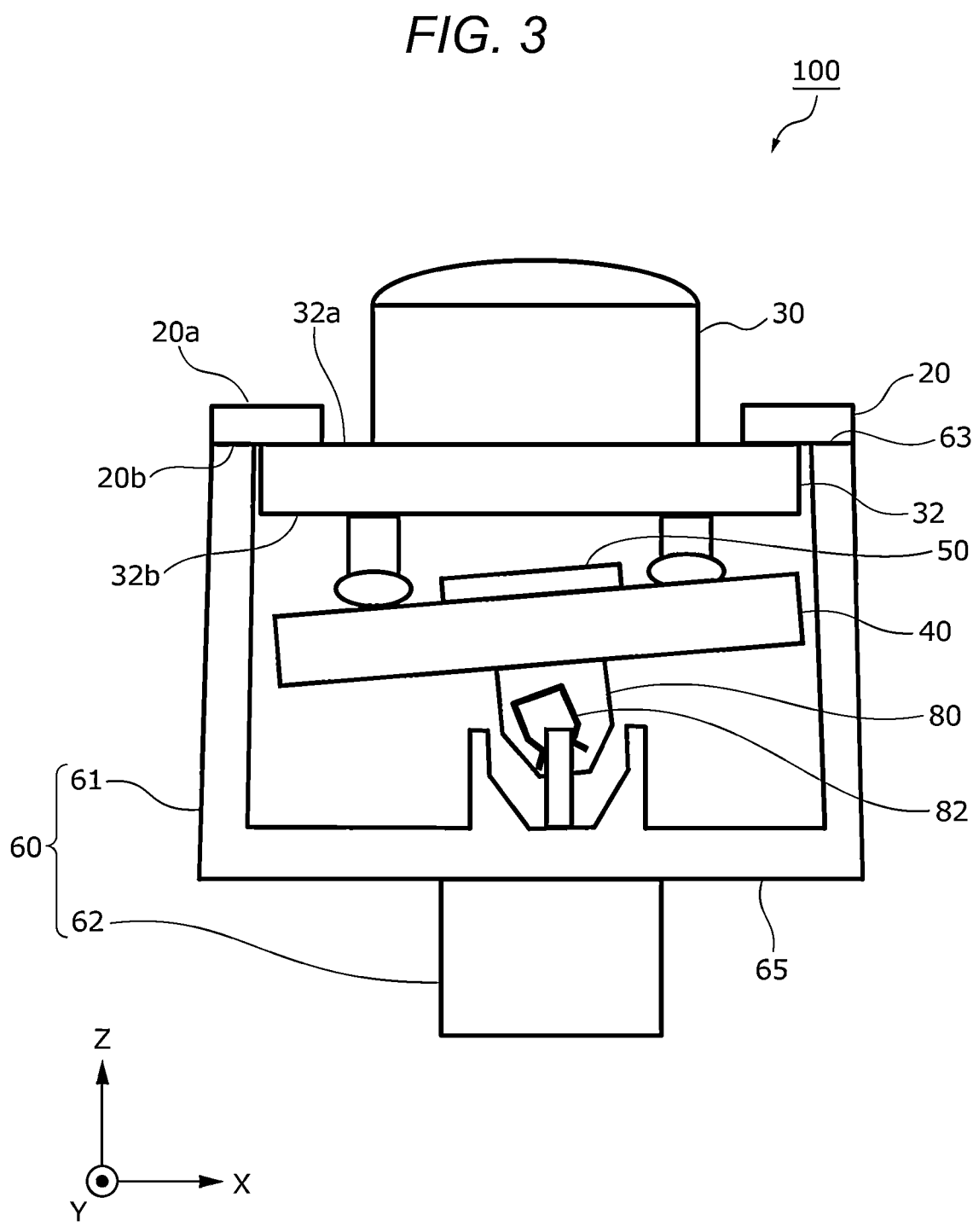
FIG. 3 is a schematic cross-sectional view of a vehicular camera in the related art.

FIG. 3 is a schematic cross-sectional view of a vehicular camera 100Z in the related art. In the vehicular camera 100Z in FIG. 3, the cap 10 is not shown (the same applies to the following drawings). The vehicular camera 100Z is assembled according to the following procedure. First, the flange portion 32 of the lens unit 30 and the fourth surface 20b of the ring member 20 are welded by the laser welding. The first cylindrical portion 37 of the lens unit 30 and the ring member 20 are orthogonal to each other.

Next, the circuit board 40 on which the image capturing element 50 is mounted is provided in a jig (not shown) and is disposed behind the lens unit 30. The jig surrounds an outer periphery of the circuit board 40 as in the case of the housing 60 to be attached later.

Next, the lens unit 30 is moved and rotated along the XYZ axes by using a robot or the like while the image capturing element 50 captures an image, and a position and a posture of the lens unit 30 are adjusted. The image capturing element 50 captures, for example, an image of a lattice-like test pattern, and a monitor screen displays the captured image. The position and the posture of the lens unit 30 are adjusted to obtain a captured image whose focus is correctly adjusted.

When the adjustment of the position and the posture of the lens unit 30 is completed, the jig is removed, and the end surface 63 of the housing 60 and the ring member 20 are welded by the laser welding, thereby completing the assembly of the vehicular camera 100Z. The connector 80 disposed over the inside and the outside of the housing 60 is provided on a bottom surface 65 of the housing 60, and the connector 80 is connected to the circuit board 40. Accordingly, the circuit board 40 can transmit and receive a signal to and from an external device via the connector 80.

As a result of the adjustment of the lens unit 30, the circuit board 40 is inclined relative to the lens unit 30 and the housing 60 as illustrated. Therefore, the connector 80 is connected to the circuit board 40 in an inclined state. In order to eliminate such an inclination, the connector 80 generally absorbs the inclination of the circuit board 40 by a spring 82 having a floating structure.

However, since the connector 80 is inclined with respect to the circuit board 40, transmission characteristics of the signal by the connector 80 are deteriorated, and in particular, there is a possibility that high-speed communication or wireless communication using a high frequency signal is adversely affected.

The vehicular camera 100 according to the present embodiment solves the problem described above. The vehicular camera 100 according to the embodiment is manufactured according to schematic cross-sectional views of FIGS. 4A to 4F and a manufacturing method illustrated by a flowchart of FIG. 5. Hereinafter, the manufacturing method will be described. FIG. 5 is a flowchart illustrating the procedure of the manufacturing method of the vehicular camera 100 according to the embodiment.

Figure 4A:
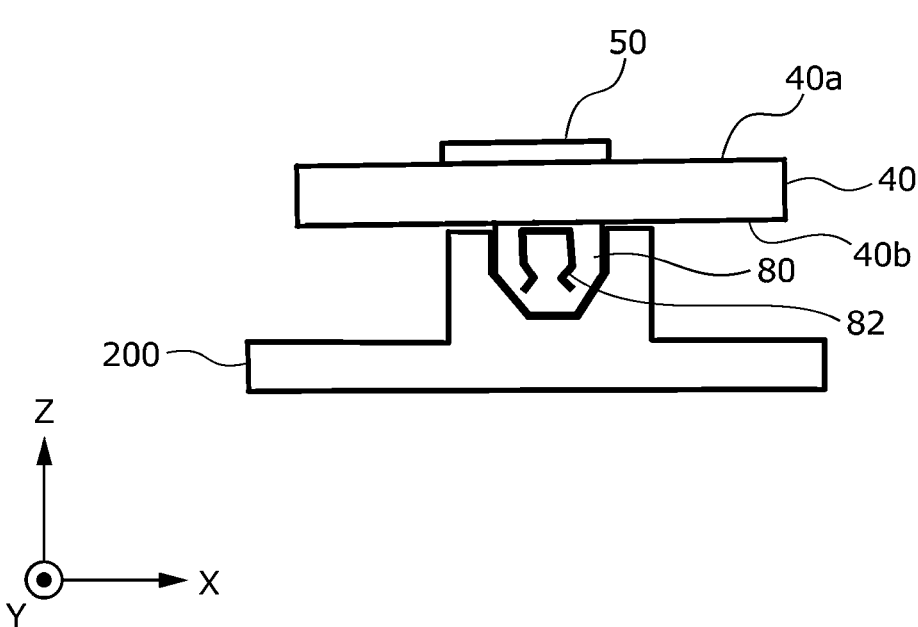
FIG. 4A is a schematic cross-sectional view of a first step in a manufacturing method of the vehicular camera according to the embodiment.

FIG. 4A is a schematic cross-sectional view of a first step in the manufacturing method of the vehicular camera 100 according to the embodiment. The circuit board 40 on which the connector 80 and the image capturing element 50 are mounted is provided in a first jig 200 (step S1). The connector 80 is electrically connected to the second surface 40b of the circuit board 40. In particular, the connector 80 can include the spring 82, and a longitudinal direction (an optical axis direction) thereof is orthogonal to the second surface 40b of the circuit board 40. A position of the image capturing element 50 is not limited in this step.

Figure 4B:
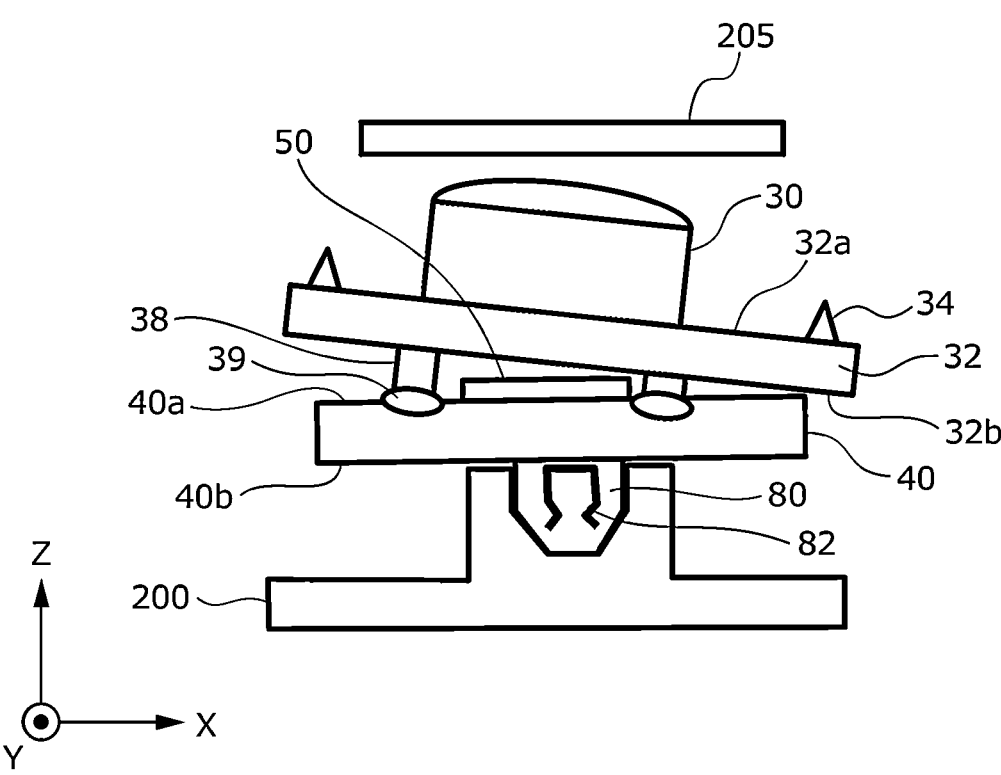
FIG. 4B is a schematic cross-sectional view of a second step in the manufacturing method of the vehicular camera according to the embodiment.

FIG. 4B is a schematic cross-sectional view of a second step in the manufacturing method of the vehicular camera 100. The lens unit 30 is temporarily disposed on the circuit board 40, and the lens unit 30 is moved and rotated along six axes (the XYZ axes and rotation axis of each of the axes) by using the robot or the like to adjust the position and the posture of the lens unit 30 (step S2). The image capturing element 50 captures, for example, an image of a lattice-like test pattern 205, and the monitor screen displays the captured image. The position and the posture of the lens unit 30 are adjusted to obtain a captured image whose focus is correctly adjusted. A deviation on each of the X axis and the Y axis is adjusted while shifting an extraction range of the captured image. A method of adjusting the extraction range of the captured image will be described later.

In the flange portion 32, a plurality of columnar protrusions 38 protrude from the second flange surface 32b. After the lens unit 30 is positioned, the lens unit 30 is fixed to the circuit board 40 by bonding the protrusions 38 to the first surface 40a of the circuit board 40 with, for example, an adhesive 39.

Figure 4C:
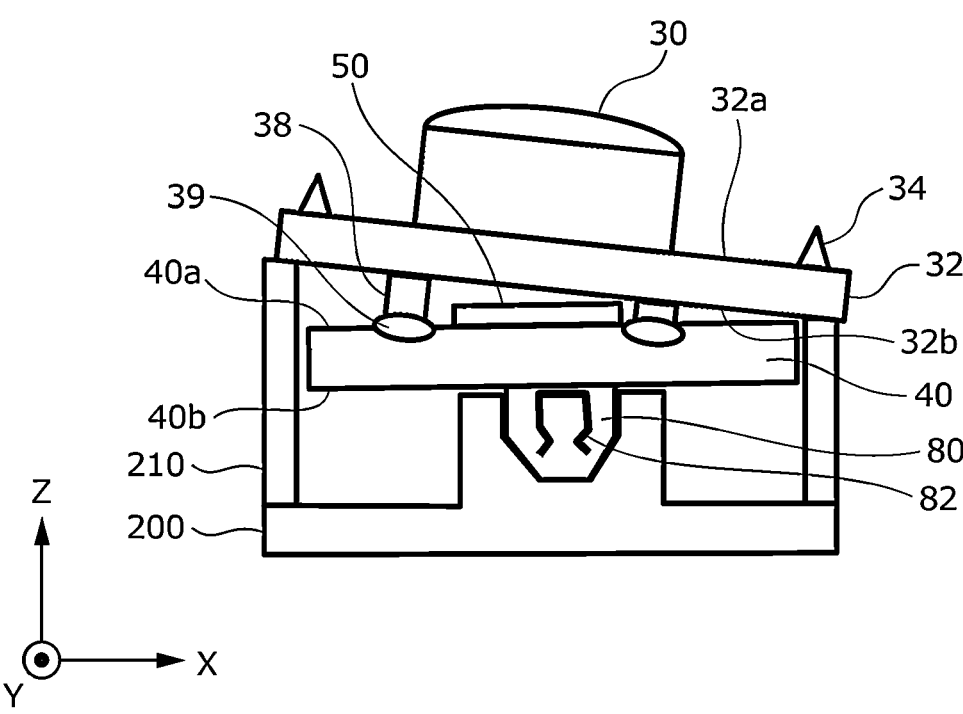
FIG. 4C is a schematic cross-sectional view of a third step in the manufacturing method of the vehicular camera according to the embodiment.

FIG. 4C is a schematic cross-sectional view of a third step in the manufacturing method of the vehicular camera 100. A second jig 210 provided in the first jig 200 supports the second flange surface 32b of the flange portion 32 in a state in which the lens unit 30 is inclined (step S3).

Figure 4D:
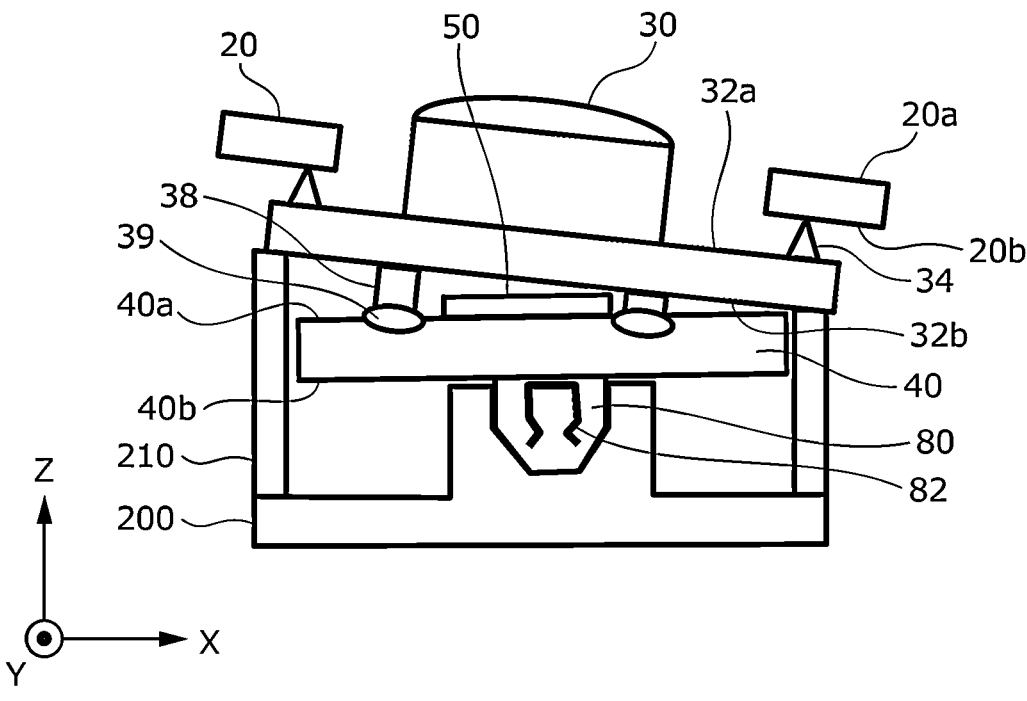
FIG. 4D is a schematic cross-sectional view of a fourth step in the manufacturing method of the vehicular camera according to the embodiment.

FIG. 4D is a schematic cross-sectional view of a fourth step in the manufacturing method of the vehicular camera 100. The ring member 20 is disposed on the flange portion 32 of the lens unit 30. In the present embodiment, the first flange surface 32a of the flange portion 32 of the lens unit 30 is provided with a welding rib 34 that protrudes toward the fourth surface 20b of the ring member 20 and is disposed over an entire periphery around the optical axis. As a result, the fourth surface 20b of the ring member 20 is disposed on the welding rib 34 over the entire periphery around the optical axis (step S4).

Figure 4E:
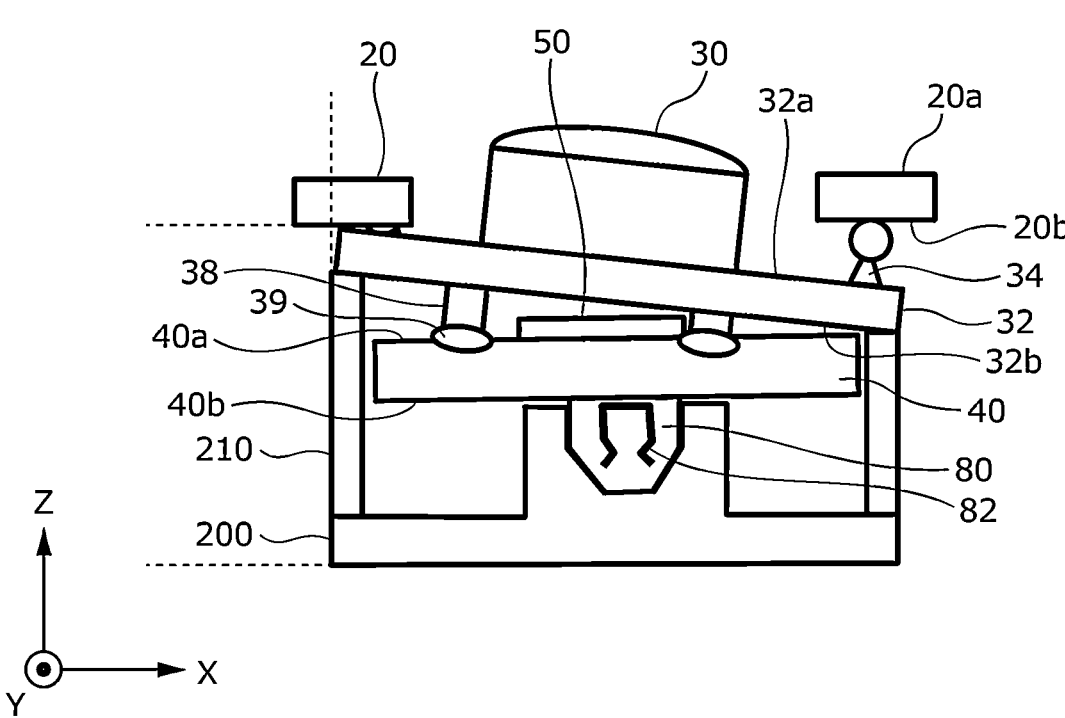
FIG. 4E is a schematic cross-sectional view of a fifth step in the manufacturing method of the vehicular camera according to the embodiment.

FIG. 4E is a schematic cross-sectional view of a fifth step in the manufacturing method of the vehicular camera 100.

The ring member 20 is welded to the flange portion 32 of the lens unit 30. In a general laser welding method, when laser light is irradiated to a light transmissive resin in a state in which a pressure is applied to the resin, the laser light is transmitted without being absorbed by the light transmissive resin and is absorbed by a surface of a light absorbing resin. The energy of the absorbed laser light is converted into heat, and the surface of the light absorbing resin is heated. Further, a surface of the light transmissive resin in contact with the surface of the light absorbing resin is also heated due to heat conduction. Accordingly, the resin is melted at a boundary surface between the light absorbing resin and the light transmissive resin. When the laser light irradiation is stopped, the melted resin is solidified and both resins are welded.

In the present embodiment, since the flange portion 32 of the lens unit 30 includes the welding rib 34, the fourth surface 20b of the ring member 20 is welded to the welding rib 34. Here, the laser welding is performed such that the ring member 20 is parallel to the first jig 200 and is orthogonal to the second jig 210 (step S5). At this time, the ring member 20 is caused to sink on a flange portion 32 side while partially melting the welding rib 34, and the ring member 20 becomes parallel to the first jig 200 and becomes orthogonal to the second jig 210 as indicated by a broken line by changing the degree of melting of the welding rib 34 according to a location. Accordingly, the ring member 20 is welded to be parallel to the circuit board 40 in the state in which the lens unit 30 is inclined.

Figure 4F:
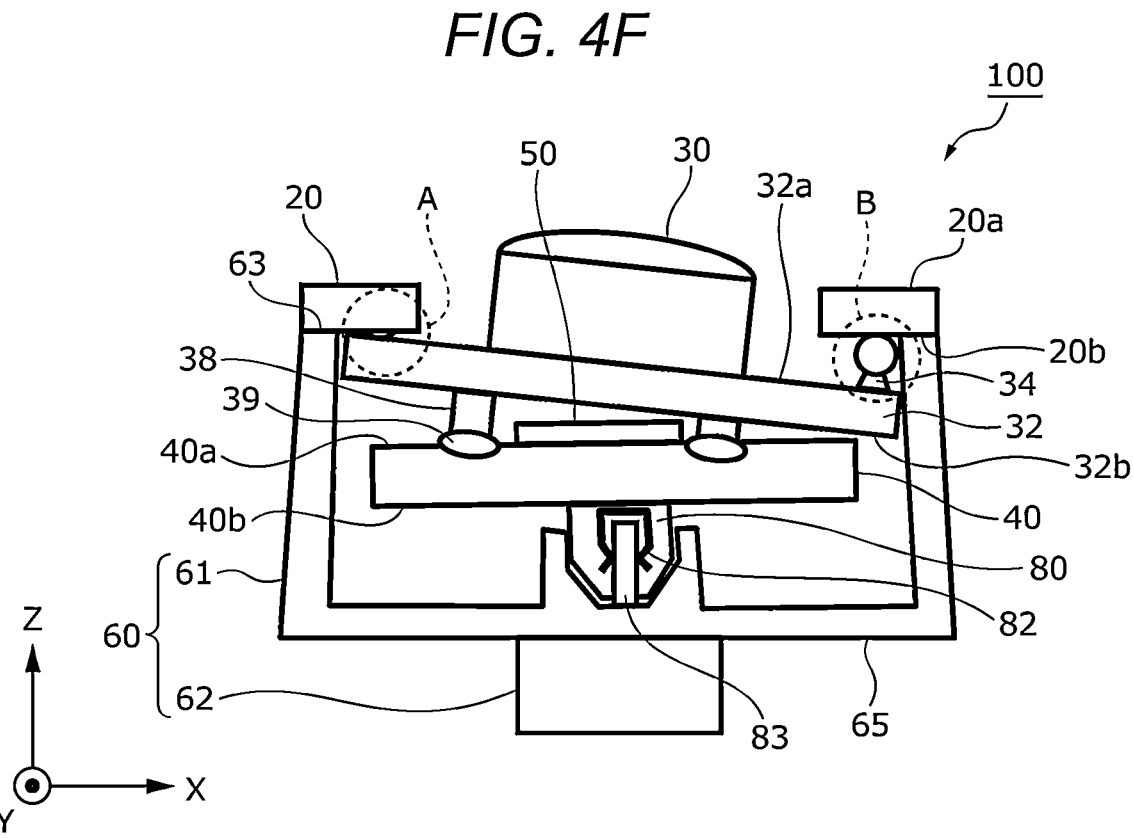
FIG. 4F is a schematic cross-sectional view of a sixth step in the manufacturing method of the vehicular camera according to the embodiment.

FIG. 4F is a schematic cross-sectional view of a sixth step in the manufacturing method of the vehicular camera 100. The first jig 200 and the second jig 210 are removed, and the housing 60 is provided. The housing 60 is provided such that the end surface 63 of the large-diameter tubular portion 61 faces the fourth surface 20b of the ring member 20. Then, the fourth surface 20b of the ring member 20 is welded to the end surface 63 of the housing 60 (step S6).

At this time, an axis line 83 of the connector 80 fixed to the bottom surface 65 of the housing 60 is connected to the spring 82 disposed on the second surface 40b of the circuit board 40. Since the circuit board 40 is also parallel to the bottom surface 65 of the housing 60, the spring 82 is connected to the axis line 83 in a straight line without moving. As a result, the longitudinal direction of the connector 80 is orthogonal to the second surface 40b of the circuit board 40, and the connector 80 is connected to the circuit board 40 without being inclined.

FIG. 6 is a perspective view in which a cross section of the lens unit 30 before the assembly of the vehicular camera 100 is exposed. The welding rib 34 has a substantially triangular cross-sectional shape before the assembly. In step S4 of FIG. 4D, the fourth surface 20b of the ring member 20 is disposed in contact with an apex X of a substantially triangular cross section of the welding rib 34. Since the welding rib 34 is formed around the optical axis over the entire periphery of the flange portion 32, the fourth surface 20b of the ring member 20 is disposed on an edge 34a which is an aggregate of the apex X.

The flange portion 32 of the lens unit 30 facing the ring member 20 is inclined with respect to the first jig 200 and the circuit board 40. As a result, in step S4 of FIG. 4D, when the fourth surface 20b of the ring member 20 is disposed on the welding rib 34, the ring member 20 is inclined with respect to the first jig 200 and the circuit board 40.

In this state, the laser welding is performed such that the ring member 20 is parallel to the first jig 200 and the circuit board 40 as in step S5 of FIG. 4E. Such welding is performed while adjusting a posture of the ring member 20 such that a protrusion height of the welding rib 34 from the flange portion 32 varies depending on a position on the entire periphery of the flange portion 32 or the welding rib 34 after the welding.

Figure 7A:
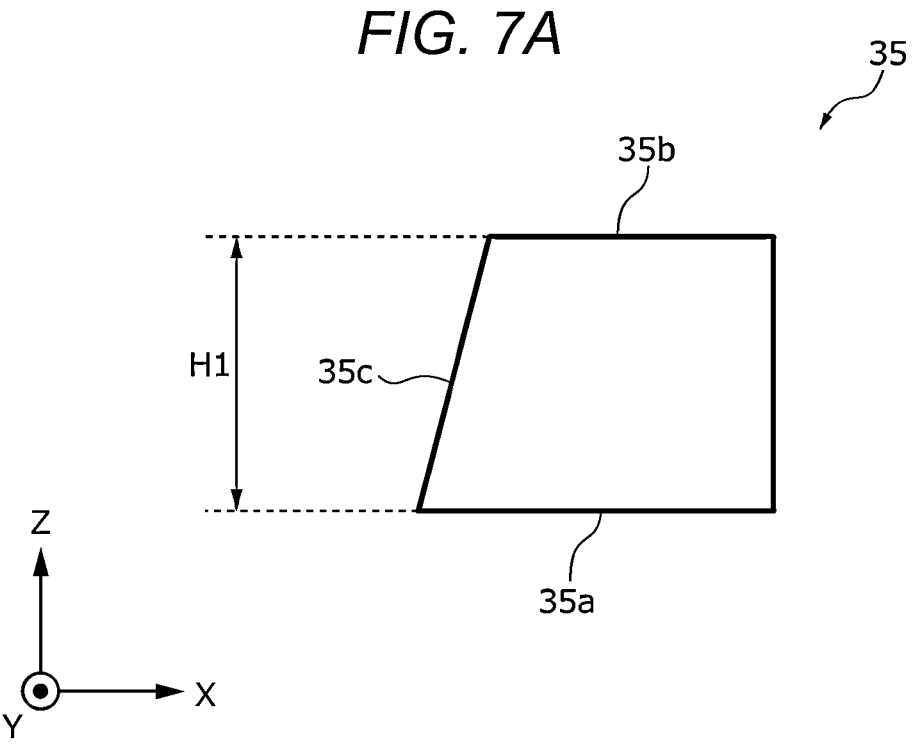
FIG. 7A is a schematic cross-sectional view of a first portion of a welding rib.
Figure 7B:
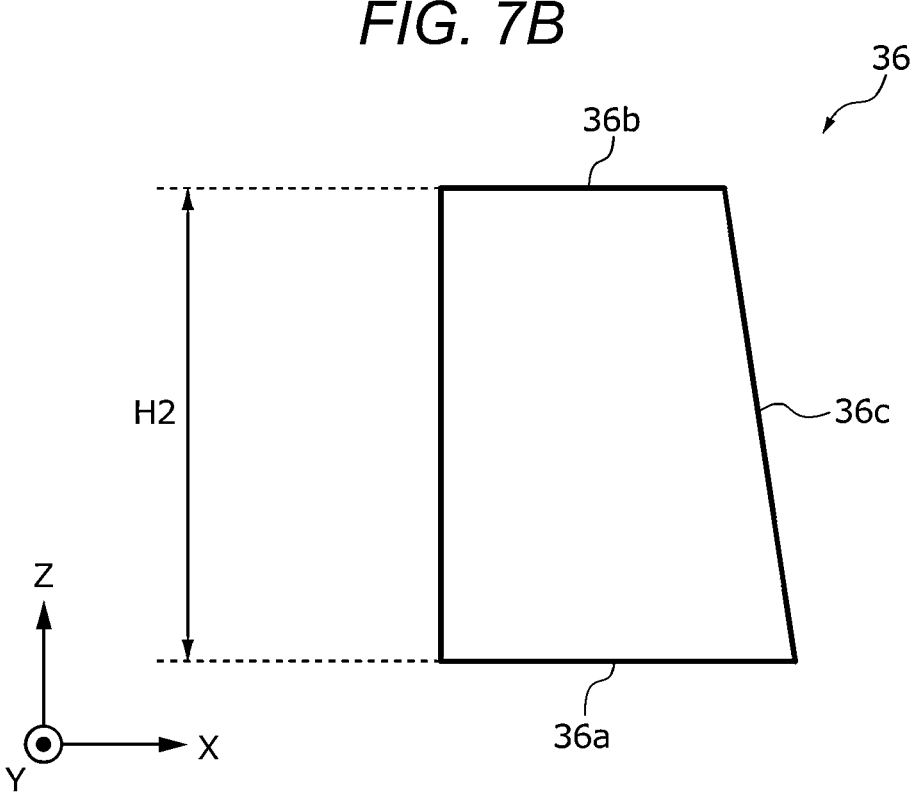
FIG. 7B is a schematic cross-sectional view of a second portion of the welding rib.

As a result of the welding, the welding rib 34 at least includes a plurality of portions having different protrusion heights and protruding from the flange portion 32 along the optical axis direction, for example, a first portion and a second portion. In FIG. 4F, a first portion 35 exists in a region A, and a second portion 36 different from the first portion 35 exists in a region B. FIG. 7A is a schematic cross-sectional view of the first portion 35 existing in the region A, and FIG. 7B is a schematic cross-sectional view of the second portion 36 existing in the region B.

In the process of FIG. 4E, the ring member 20 is caused to sink, and as compared with FIG. 4D, a sinking amount in the region A is different from a sinking amount in the region B, and the sinking amount in the region A is larger than the sinking amount in the region B. This means that the first portion 35 and the second portion 36 protrude from the flange portion 32 at different heights along the optical axis direction. As is clear from FIGS. 7A and 7B, a first height H1 at which the first portion 35 protrudes from the flange portion 32 along the optical axis direction is different from a second height H2 at which the second portion 36 protrudes from the flange portion 32 along the optical axis direction. In this example, the first height H1 is smaller than the second height H2 (H1<H2).

Accordingly, even when the flange portion 32 of the lens unit 30 is inclined with respect to the circuit board 40 as a result of the adjustment of the lens unit 30, the ring member 20 is welded to the welding rib 34 of the flange portion 32 in a state in which the ring member 20 is not inclined with respect to the circuit board 40 by the action of the welding rib 34. Specifically, the first portion 35 and the second portion 36 having different heights of the welding rib 34 absorb the inclination of the flange portion 32 with respect to the circuit board 40, and position the ring member 20 to be parallel to the circuit board 40.

Therefore, the ring member 20 is disposed to be parallel to the circuit board 40, and the housing 60 is attached to the ring member 20 in a state of being parallel to the optical axis. As a result, since the connector 80 disposed over the inner side and the outer side of the housing 60 is connected to the circuit board 40 without being inclined, it is possible to restrain the deterioration of the transmission characteristics of the connector 80.

A first cross section of the first portion 35 illustrated in FIG. 7A and a second cross section of the second portion 36 illustrated in FIG. 7B exist in a cross section orthogonal to the third surface 20a of the ring member 20 and in the radial direction around the optical axis. A first area of the first cross section of the first portion 35 is different from a second area of the second cross section of the second portion 36. Accordingly, the ring member 20 can be welded to the welding rib 34 of the flange portion 32 in the state in which the ring member 20 is not inclined with respect to the circuit board 40 by the first portion 35 and the second portion 36 having different cross-sectional areas.

The first cross section of the first portion 35 has a first quadrilateral shape, and the second cross section of the second portion 36 has a second quadrilateral shape different from the first quadrilateral shape. Accordingly, the ring member 20 can be stably welded to the welding rib 34 of the flange portion 32 in the state in which the ring member 20 is not inclined with respect to the circuit board 40 by the first portion 35 and the second portion 36 each having the cross section in the quadrilateral shape.

Specifically, the first quadrilateral shape of the first portion 35 includes a first side 35a on the flange portion 32 side and a second side 35b that faces the first side 35a and is shorter than the first side 35a. The second quadrilateral shape of the second portion 36 includes a third side 36a on the flange portion 32 side and a fourth side 36b that faces the third side 36a and is shorter than the second side 35b and the third side 36a.

The welding rib 34 has the substantially triangular cross-sectional shape illustrated in FIG. 6 on the entire periphery before the welding. At the time of the welding, a portion including the apex X of the substantially triangular shape melts, but an amount of melting of the first portion 35 is larger than that of the second portion 36, and as a result, the fourth side 36b of the second portion 36 becomes shorter than the second side 35b of the first portion 35. Accordingly, the ring member 20 can be stably welded to the welding rib 34 of the flange portion 32 in the state in which the ring member 20 is not inclined with respect to the circuit board 40 by the first portion 35 and the second portion 36 each having the cross section expanding toward the flange portion 32 side.

In addition, the first quadrilateral shape of the first cross section of the first portion 35 includes a fifth side 35c inclined with respect to a direction along the optical axis, and the second quadrilateral shape of the second cross section of the second portion 36 includes a sixth side 36c inclined with respect to the direction along the optical axis. The fifth side 35c and the sixth side 36c are derived from oblique sides of the substantially triangular cross-sectional shape in FIG. 6.

Accordingly, the ring member 20 can be stably welded to the welding rib 34 of the flange portion 32 in the state in which the ring member 20 is not inclined with respect to the circuit board 40 by the first portion 35 and the second portion 36 each having the inclined side.

In an actual product, the height of the welding rib 34 protruding from the flange portion 32 along the optical axis generally varies depending on the position on the entire periphery of the flange portion 32. Each of the first portion 35 and the second portion 36 corresponds to a portion obtained by extracting a part of the cross section of the entire periphery of the welding rib 34.

Accordingly, the ring member 20 can be welded to the welding rib 34 of the flange portion 32 in the state in which the ring member 20 is not inclined with respect to the circuit board 40 over the entire periphery of the flange portion 32 by the welding rib 34 whose height varies depending on the position on the entire periphery of the flange portion 32.

Further, on the bottom surface 65 of the large-diameter tubular portion 61 of the housing 60, which corresponds to the second surface 40b of the circuit board 40, the connector 80 is disposed over the inner side and the outer side of the housing 60 and is electrically connected to the second surface 40b of the circuit board 40. In the flange portion 32 of the lens unit 30, the plurality of protrusions 38 protruding from the second flange surface 32b opposite to the first flange surface 32a on which the welding rib 34 is formed are fixed to the first surface 40a of the circuit board 40. At least three protrusions 38, such as a first protrusion, a second protrusion, and a third protrusion, are provided.

Accordingly, the connector 80 can be stably connected to the circuit board 40, and the lens unit 30 can be stably disposed on the circuit board 40 by the at least three protrusions 38.

The longitudinal direction of the connector 80 is orthogonal to the second surface 40*b* of the circuit board 40. Accordingly, since the connector 80 is connected in a state of being orthogonal to the circuit board 40, excellent transmission characteristics can be secured.

The connector 80 may be a coaxial connector or an STQ connector. Accordingly, high-speed communication or wireless communication using a high frequency signal can be achieved.

Figure 8A:
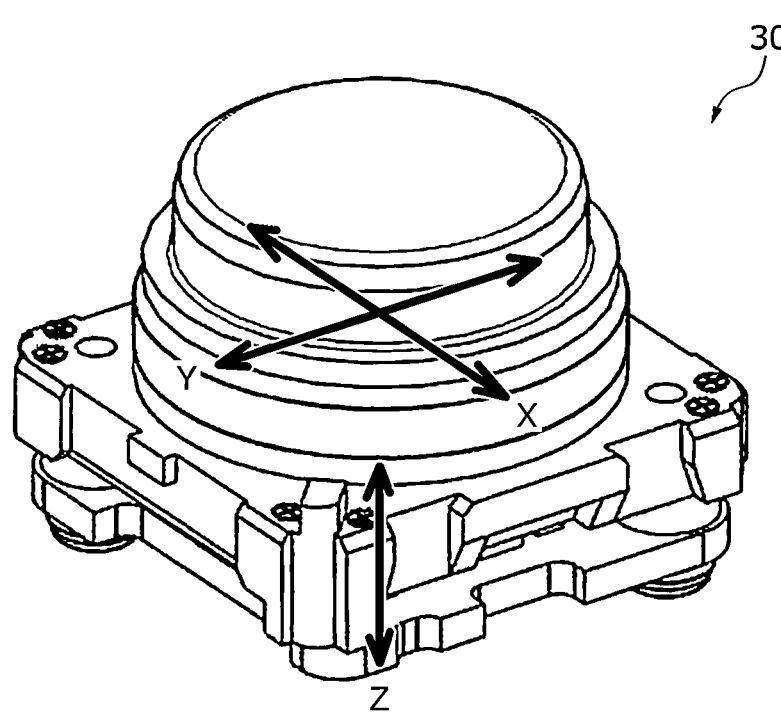
FIG. 8A is a schematic diagram illustrating axes for adjusting the lens unit in a 3-axis adjustment.
Figure 8B:
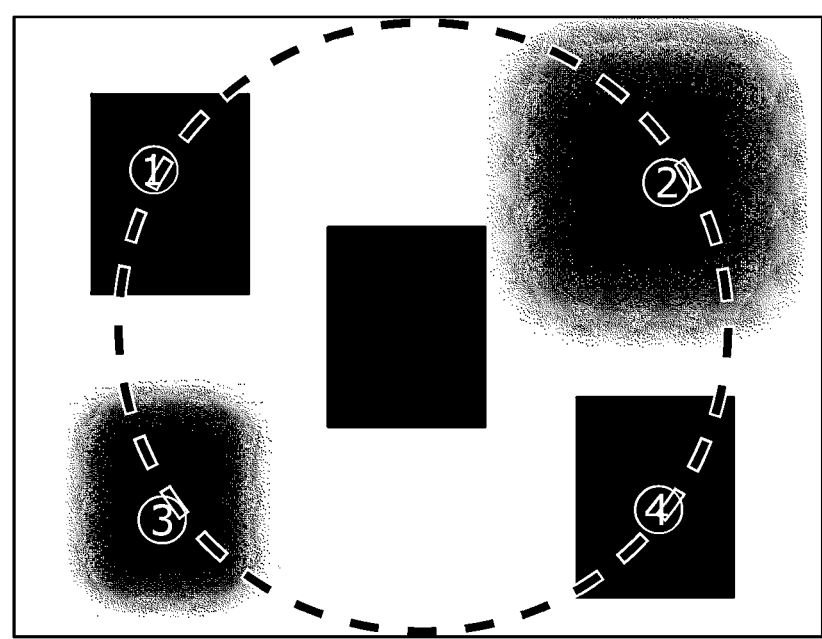
FIG. 8B is an image diagram of an image obtained in the 3-axis adjustment.
Figure 8C:
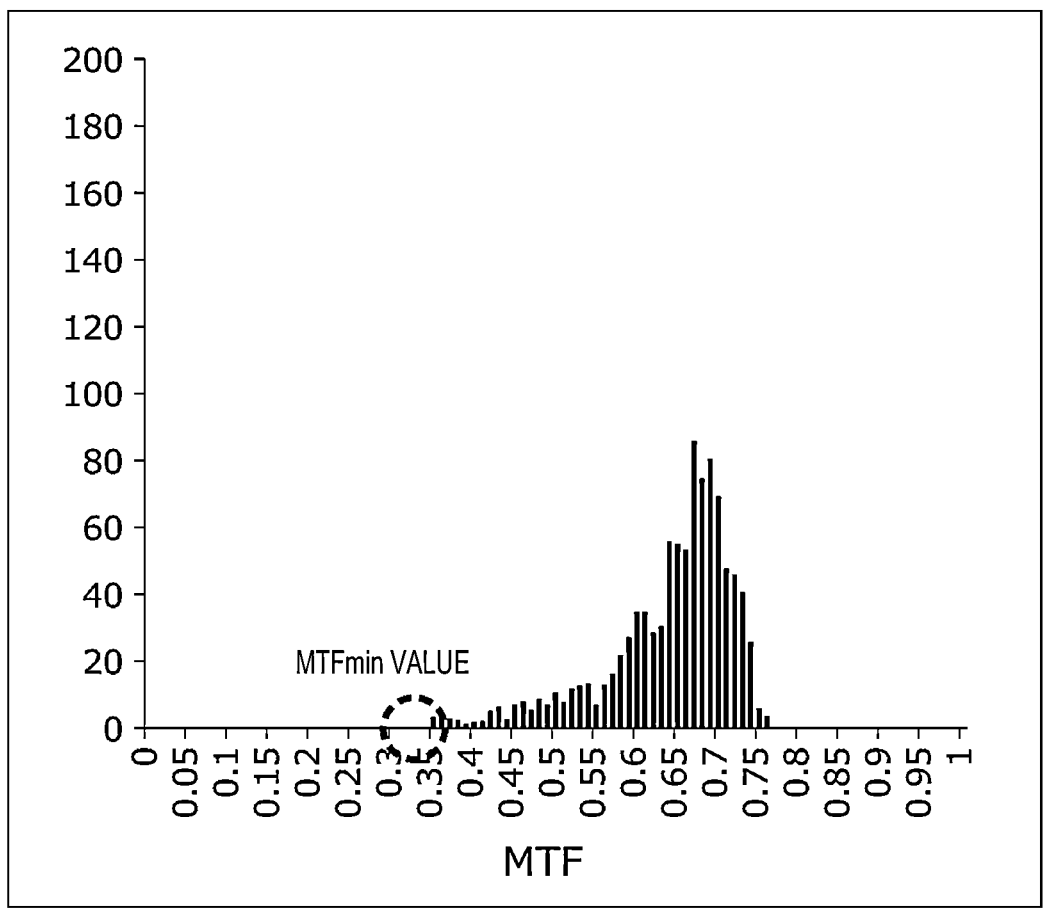
FIG. 8C is a graph of MTF obtained in the 3-axis adjustment.

FIGS. 8A to 8C are diagrams illustrating an outline of a case in which a 3-axis adjustment of the lens unit 30 is performed. FIG. 8A is a schematic diagram illustrating the axes for adjusting the lens unit 30 in the 3-axis adjustment, and the 3-axis adjustment is performed by moving the lens unit 30 relative to the circuit board 40 and the image capturing element 50 along each of the X axis, the Y axis, and the Z axis. FIG. 8B is an image diagram of a captured image obtained in the 3-axis adjustment, and it can be seen from this diagram that a peripheral portion is blurred.

Figure 9A:
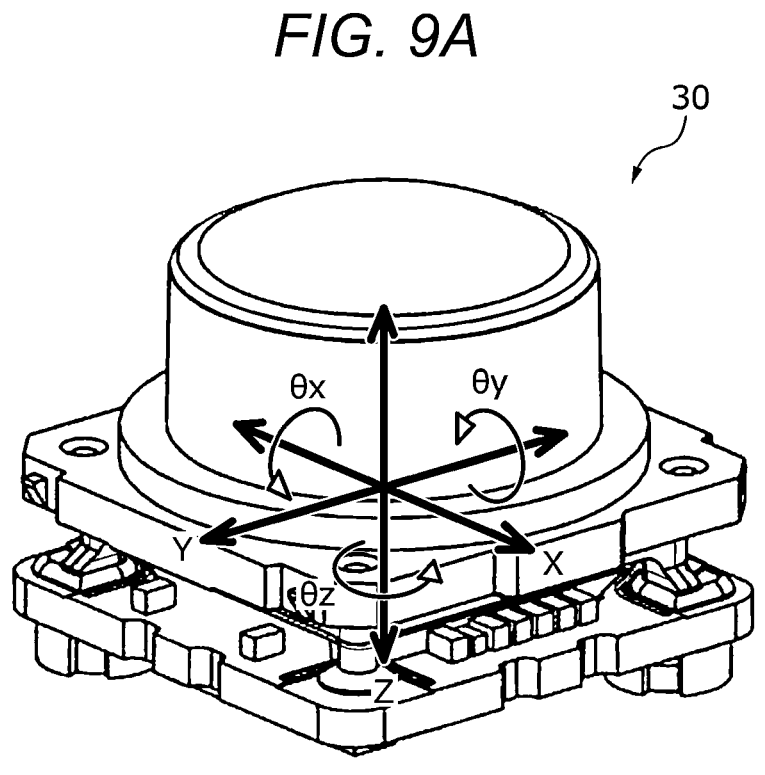
FIG. 9A is a schematic diagram illustrating axes for adjusting the lens unit in a 6-axis adjustment.
Figure 9B:
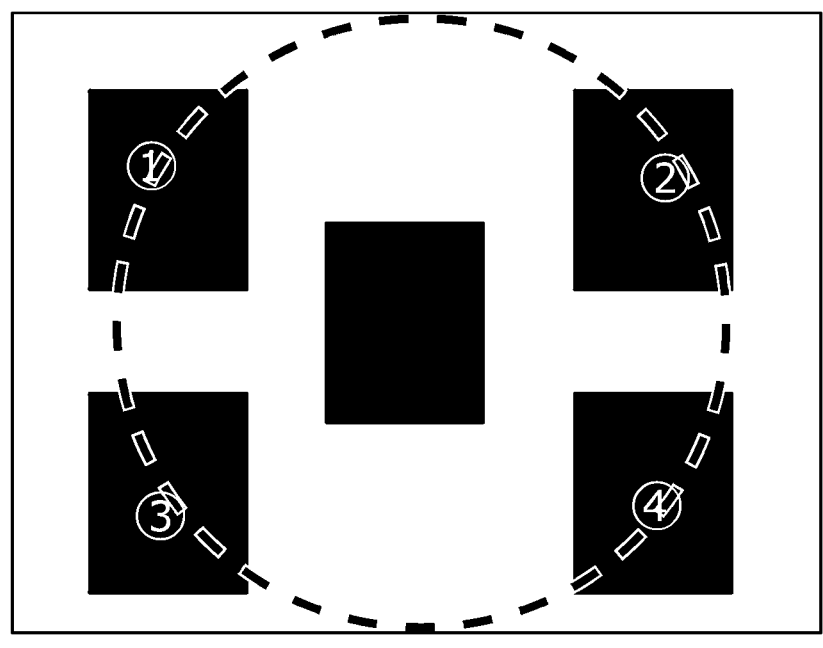
FIG. 9B is an image diagram of an image obtained in the 6-axis adjustment.
Figure 9C:
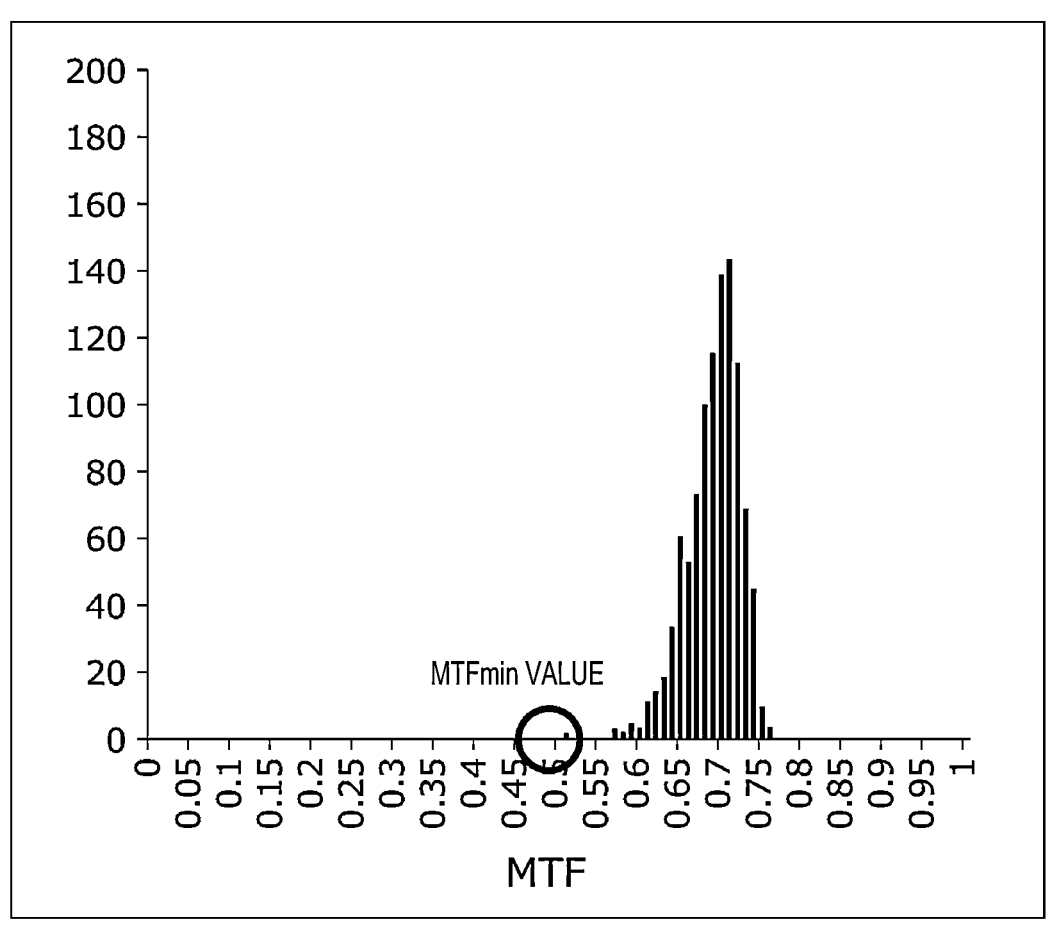
FIG. 9C is a graph of MTF obtained in the 6-axis adjustment.

FIGS. 9A to 9C are diagrams illustrating an outline of a case in which a 6-axis adjustment of the lens unit 30 is performed. FIG. 9A is a schematic diagram illustrating axes for adjusting the lens unit 30 in the 6-axis adjustment, and the 6-axis adjustment is performed by moving the lens unit 30 relative to the circuit board 40 and the image capturing element 50 along each of the X axis, the Y axis, and the Z axis, and rotating the lens unit 30 around each of a rotation axis 6*x*, a rotation axis Oy, and a rotation axis 6*z* corresponding to the axes. FIG. 9B is an image diagram of a captured image obtained in the 6-axis adjustment, and it can be seen from this diagram that the peripheral portion is not blurred and a high-quality image is obtained.

On the other hand, FIG. 8C is a graph of a modulation transfer function (MTF) obtained in the 3-axis adjustment. The MTF is used to evaluate lens performance, and the larger a value thereof, the higher the lens performance. In this example, regarding a plurality of lens units 30, the MTF at an image capturing angle (a broken line circle in FIG. 8C) set to 60% of a maximum angle of view from an image capturing center of the image capturing element 50 was measured. The horizontal axis of the graph indicates the MTF under this measurement, and the vertical axis thereof indicates an occurrence frequency of the MTF corresponding to the horizontal axis. FIG. 9C is a graph of the modulation transfer function (MTF) obtained in the 6-axis adjustment.

When the graphs of FIGS. 8C and 9C are compared, it is understood that the MTF obtained in the 6-axis adjustment has a smaller variation than the MTF obtained in the 3-axis adjustment. In addition, regarding an MTFmin value which is a minimum value of the MTF, it is understood that a value (50%) obtained in the 6-axis adjustment is larger than a value (30%) obtained in the 3-axis adjustment. That is, the 6-axis adjustment can more appropriately determine the position and the posture of the lens unit 30 than the 3-axis adjustment.

The MTF is set to be, for example, 50% or more at the image capturing angle set to 60% of the maximum angle of view from the image capturing center of the image capturing element 50.

Figure 10:
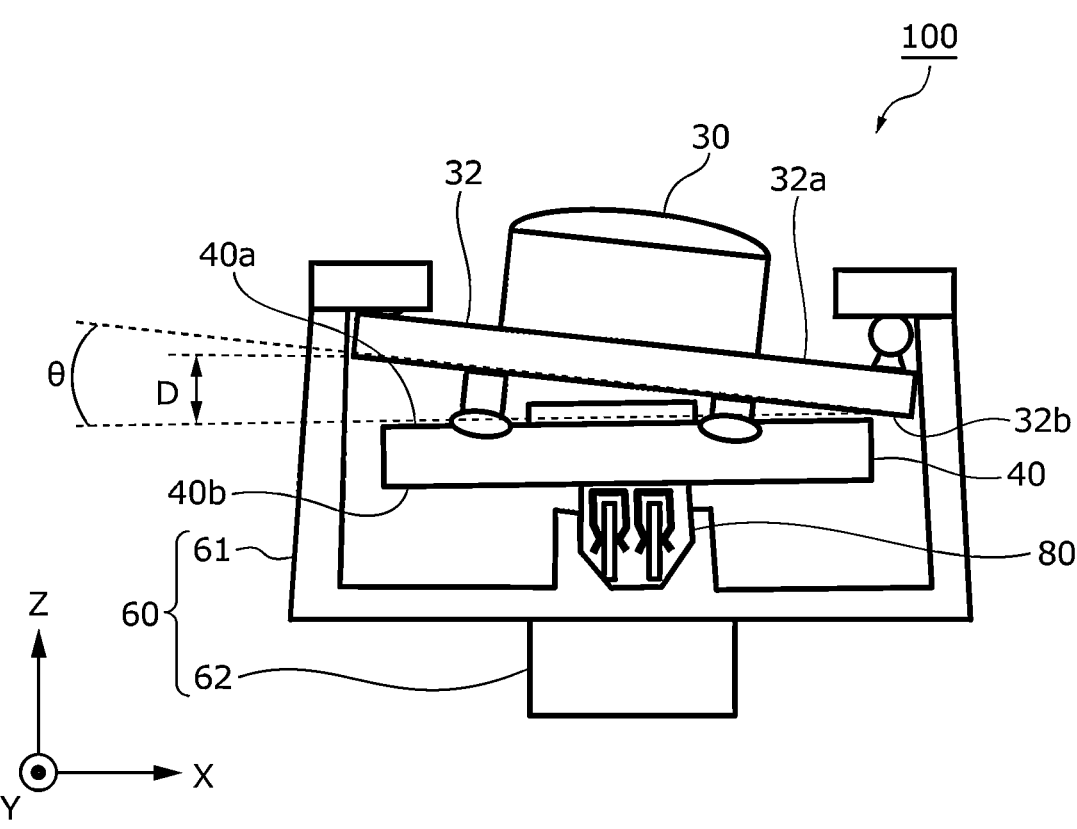
FIG. 10 is a schematic cross-sectional view illustrating a distance and an inclination angle of a flange portion of the lens unit with respect to a circuit board in the vehicular camera according to the embodiment.

FIG. 10 is a schematic cross-sectional view of the vehicular camera 100 as in FIG. 4, and illustrates a distance D and an inclination angle θ of the flange portion 32 of the lens unit 30 with respect to the circuit board 40. One end of the second flange surface 32*b* of the flange portion 32 is separated from one end of the first surface 40*a* of the circuit board 40 by the predetermined distance D in the direction along the optical axis.

The distance D is set to, for example, 0.4 mm or less, preferably 0.3 mm or less, more preferably 0.2 mm or less, and still more preferably 0.1 mm or less. Accordingly, it is possible to easily achieve the state in which the ring member 20 is not inclined with respect to the circuit board 40.

The flange portion 32 of the lens unit 30 is inclined at the predetermined inclination angle θ with respect to the circuit board 40. The inclination angle θ is set to, for example, 1.15° or less. Accordingly, it is possible to easily achieve the state in which the ring member 20 is not inclined with respect to the circuit board 40.

The first flange surface 32*a* of the flange portion 32 of the lens unit 30 is inclined at a predetermined inclination angle with respect to the fourth surface 20*b* of the ring member 20. This inclination angle is equal to, for example, the inclination angle θ of the flange portion 32 with respect to the circuit board 40 described above.

Accordingly, although the first flange surface 32*a* of the flange portion 32 is inclined at the predetermined inclination angle with respect to the fourth surface 20*b* of the ring member 20, the ring member 20 can be welded to the welding rib 34 of the flange portion 32 in the state in which the ring member 20 is not inclined with respect to the circuit board 40 by the first portion 35 and the second portion 36 having different heights.

Hereinafter, another embodiment is used for describing a position adjustment of the lens unit in detail. The following description can be applied to the position adjustment of the lens unit 30 on the X axis and the Y axis according to the embodiment described above.

A vehicular camera according to the another embodiment is connected to the vehicle, acquires an image of the periphery of the vehicle, and transfers the image to a vehicle side, and is devised to efficiently transfer the image to the vehicle side.

Figure 11:
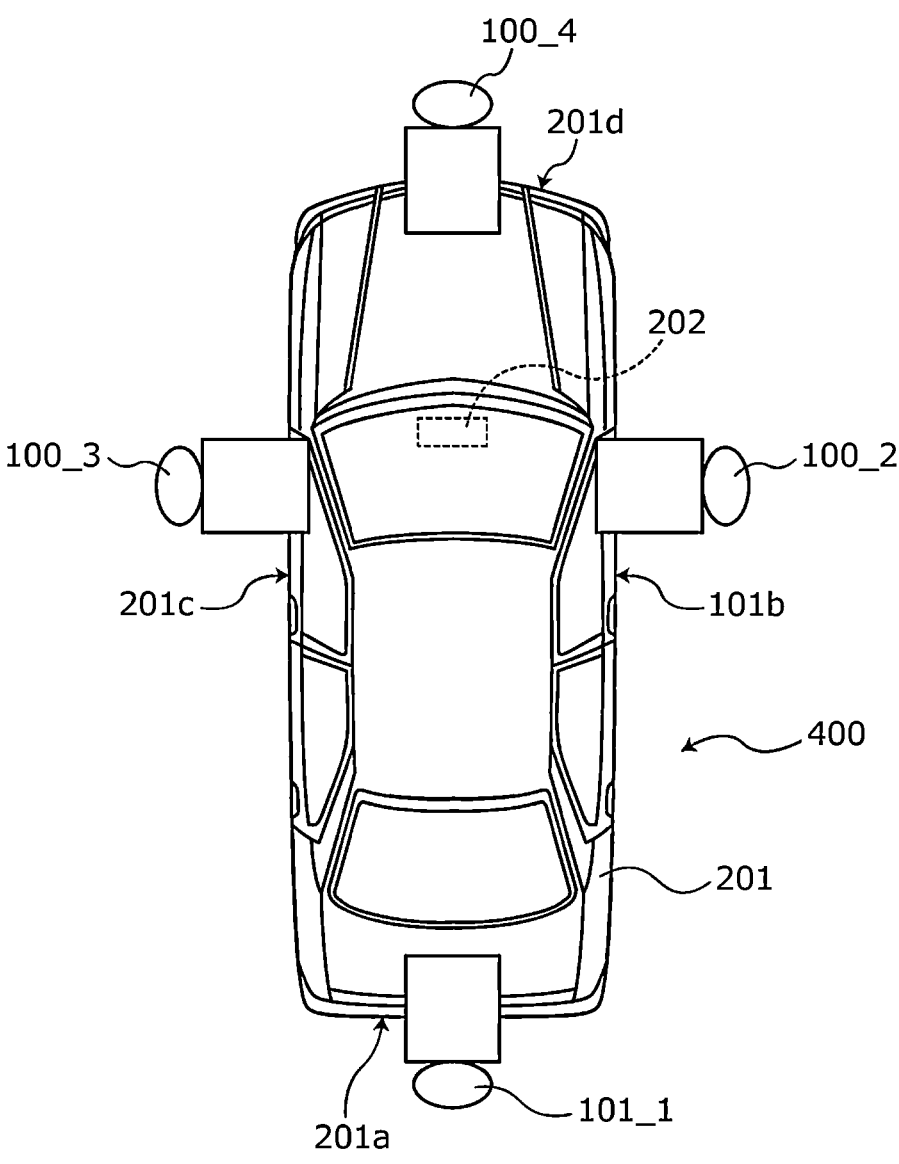
FIG. 11 is a top view illustrating a vehicle on which a vehicular camera according to another embodiment is mounted.

The vehicular camera 100 can be mounted on a vehicle 400 as illustrated in FIG. 11. FIG. 11 is a top view illustrating the vehicle 400 on which the vehicular camera 100 is mounted. The vehicular camera 100 is provided outside a vehicle body 201, and can acquire an image of the periphery of the vehicle. The vehicle 400 can process the image of the periphery of the vehicle obtained by the vehicular camera 100 and output the processed image to a predetermined display device.

FIG. 11 illustrates a configuration in which a plurality of vehicular cameras 100_1, 100_2, 100_3, and 100_4 are provided in a rear end portion 201*a*, a side end portion (the right side in FIG. 11) 201*b*, a side end portion (the left side in FIG. 11) 201*c*, and a front end portion 201*d* of the vehicle body 201, respectively. Each of images obtained by the vehicular cameras 100_1, 100_2, 100_3, and 100_4 can be displayed on a display 202.

Although the four vehicular cameras 100_1 to 100_4 are illustrated in FIG. 11, the number of vehicular cameras 100 may be three or less, and may be five or more. A provided location of the vehicular camera 100 may be other locations on the vehicle body 201 at which the image of the periphery of the vehicle can be obtained. Alternatively, the provided location of the vehicular camera 100 may be other locations at which an image of the interior of a vehicle cabin in the vehicle body 201 can be obtained. An output destination of the image may be an output device other than the display 202.

Figure 12:
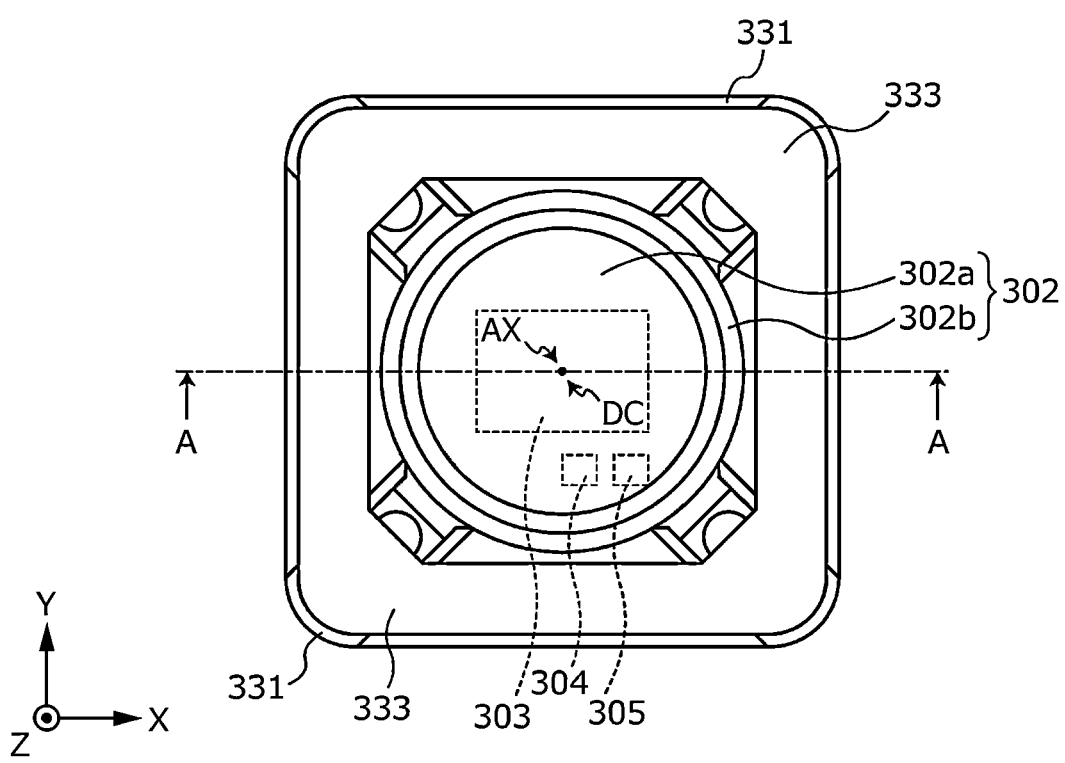
FIG. 12 is a front view illustrating a configuration of the vehicular camera according to the another embodiment.
Figure 13:
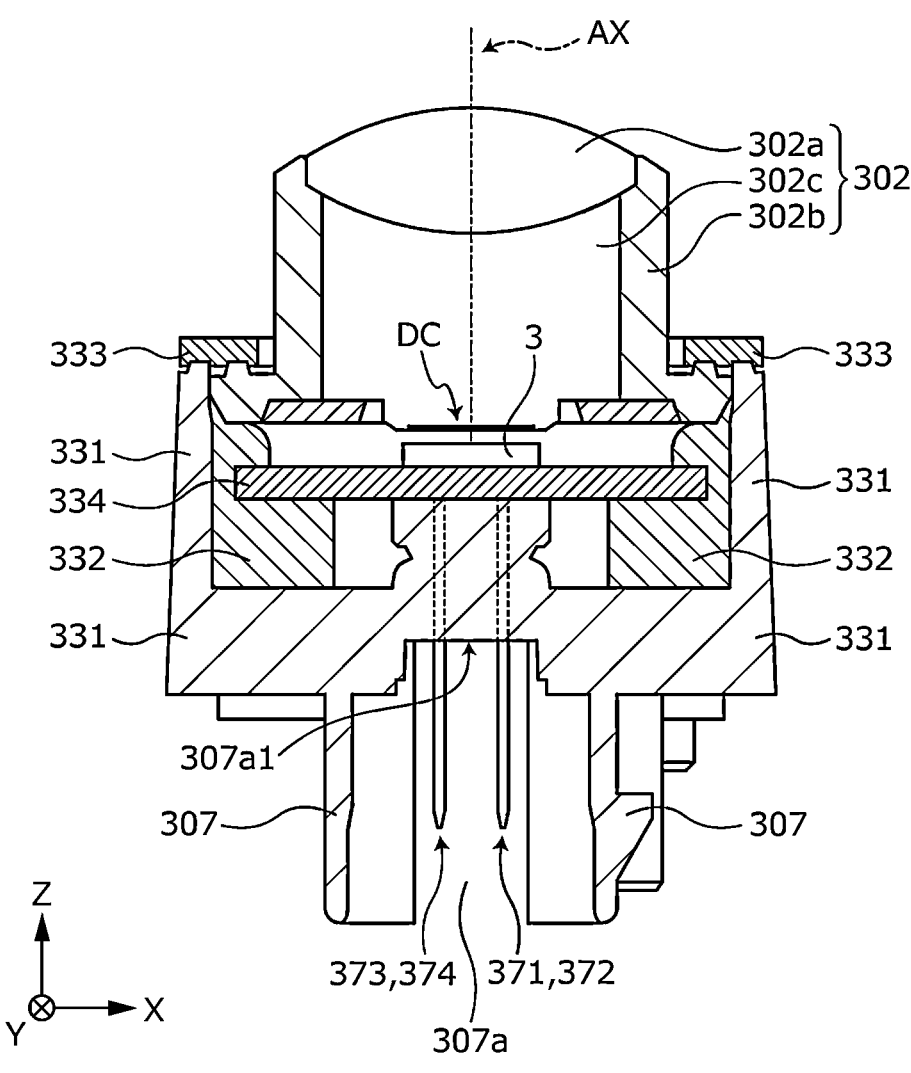
FIG. 13 is a cross-sectional view illustrating the configuration of the vehicular camera according to the another embodiment.

As illustrated in FIGS. 12 and 13, the vehicular camera 100 has a configuration suitable for being mounted on the vehicle 400. FIG. 12 is a plan view illustrating the configuration of the vehicular camera 100. FIG. 13 is a cross-sectional view illustrating the configuration of the vehicular camera 100. FIG. 13 illustrates a cross section taken along a line A-A in FIG. 12. Hereinafter, the optical axis direction of the vehicular camera 100 is defined as a Z direction, and two directions orthogonal to each other in a plane perpendicular to the Z direction are defined as an X direction and a Y direction.

The vehicular camera 100 includes a lens unit 302, a housing 331, an image capturing element 303, an image signal processor (ISP) 304, a nonvolatile memory 305, a circuit board 334, a connector 307, a potting 332, and a ring member 333.

The lens unit 302 includes a lens 302a and a barrel 302b. The lens 302a is disposed on an upstream side (+Z side) of an optical axis AX in the vehicular camera 100. The lens 302a can cause a subject image to be formed on an image forming surface. The lens 302a may have a distortion aberration. The lens 302a is formed of a translucent member such as glass. FIG. 12 illustrates a configuration in which the lens unit 302 includes one lens 302a, and the lens unit 302 may include a plurality of lenses 302a.

The barrel 302b holds the lens 302a from the outside in the X and Y directions. The barrel 302b has a hollow portion 302c through which the optical axis AX passes inward in the X and Y directions, and guides light from the lens 302a to a downstream side (−Z side) along the optical axis AX. The barrel 302b may be formed of a light shielding material.

The housing 331 is a box-shaped member that is open on the +Z side. The housing 331 may be formed of a light shielding material. The housing 331 is disposed on the −Z side of the lens unit 302. The housing 331 accommodates the image capturing element 303, the ISP 304, the nonvolatile memory 305, and the circuit board 334.

An end of the barrel 302b on the −Z side is connected. Apart of the barrel 302b, which is located outside in the X and Y directions, at an end of the housing 331 on the +Z side is covered with the ring member 333.

The circuit board 334 is fixed to the housing 331 by screw fitting or the like. At least the image capturing element 303 is mounted on the circuit board 334. Further, the ISP 304 and the nonvolatile memory 305 can be mounted on the circuit board 334. The image capturing element 303, the ISP 304, and the nonvolatile memory 305 are mounted on separate chips, and may be mounted on a main surface of the circuit board 334 on the +Z side. The potting 332 may be interposed between the circuit board 334 and the housing 331. The potting 332 can be formed of a waterproof material.

In addition, the image capturing element 303, the ISP 304, and the nonvolatile memory 305 may be mounted on one chip, or may be separately mounted on a plurality of chips. The image capturing element 303 and the ISP 304 may be mounted on one chip, and the nonvolatile memory 305 may be mounted on another chip.

The image capturing element 303, the ISP 304, and the nonvolatile memory 305 may be mounted on different circuit boards. For example, the vehicular camera 100 may further include a circuit board 335 (not shown), the image capturing element 303 and the ISP 304 may be mounted on the circuit board 334 as one chip or separate chips, and the nonvolatile memory 305 may be mounted on the circuit board 335. Alternatively, the image capturing element 303 may be mounted on the circuit board 334 as one chip, and the ISP 304 and the nonvolatile memory 305 may be mounted on the circuit board 335 as one chip or separate chips.

The image capturing element 303 is disposed in the vicinity of the image forming surface of the lens 302a. The image capturing element 303 may be, for example, a complementary metal oxide semiconductor (CMOS) type image sensor, and may be a charge coupled device (CCD) type image sensor.

The ISP 304 can perform a predetermined process on a signal output from the image capturing element 303. In the ISP 304, the predetermined process may be implemented by hardware or may be implemented by software, a part of the process may be implemented by hardware, and the remaining process may be implemented by software. The ISP 304 may be disposed in the vicinity of the image capturing element 303.

The nonvolatile memory 305 can store information received from the ISP 304 in a nonvolatile manner. The nonvolatile memory 305 may be disposed in the vicinity of the ISP 304. The nonvolatile memory 305 may be a flash memory, a resistive random access memory (ReRAM), a ferroelectric random access memory (FeRAM), a magnetoresistive random access memory (MRAM), or the like.

The connector 307 functions as a mechanical connector for connecting the vehicular camera 100 to the vehicle body 201 of the vehicle 400.

The connector 307 is disposed on the −Z side of the housing 331, and is connected to the housing 331. The connector 307 is connected to the vehicle body 201 via a fixing member (not shown). Accordingly, the vehicular camera 100 is provided in the vehicle body 201.

Figure 14:
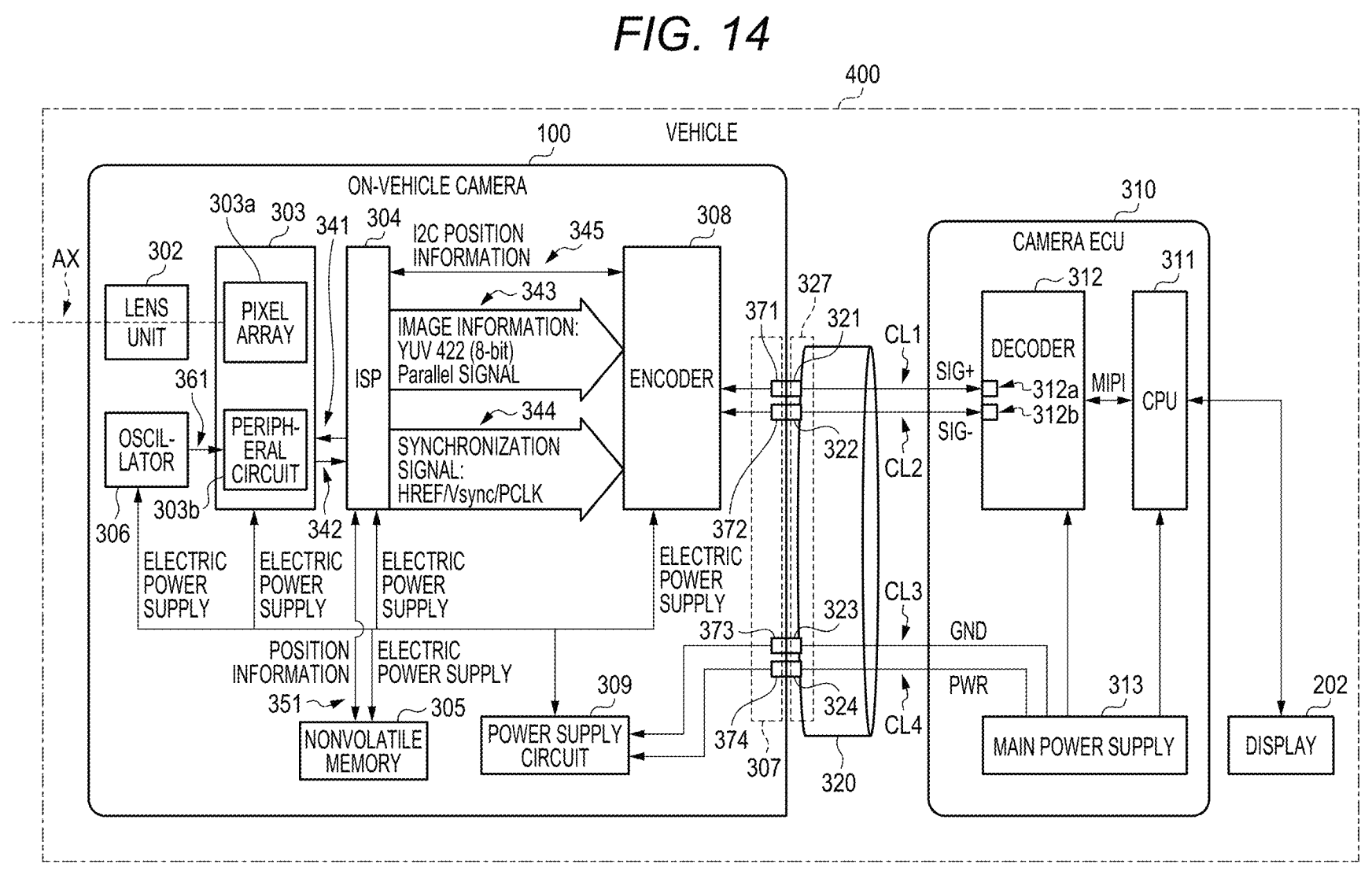

As illustrated in FIG. 14, the connector 307 also functions as an electrical connector for connecting the vehicular camera 100 to a camera electronic control unit (ECU) 300 via a cable 320 (see FIG. 14). FIG. 14 is a block diagram illustrating the configuration of the vehicular camera 100.

In the present specification, a description that a first element and a second element are "electrically connected" includes connection of the first element and the second element via a third element interposed therebetween within a range in which functions of the first element and the second element are not hindered.

The camera ECU 310 can be disposed in the vehicle body 201 of the vehicle 400. In the cable 320, a connector 327 at one end can be connected to the connector 307, and a connector at the other end can be connected to a portion in the vehicle 400 (for example, a connector for connecting to the camera ECU 310). In FIG. 14, the connector at the other end of the cable 320 is not shown for simplification.

The cable 320 can serve as a medium for serial communication between the vehicular camera 100 and the camera ECU 310. The cable 320 may transmit a single-ended signal or a differential signal between the vehicular camera 100 and the camera ECU 310.

In the cable 320, a high frequency component of loss of a signal intensity in the transmitted signal tends to be larger than a low frequency component thereof due to channel loss caused by a skin effect of a conductive wire, dielectric loss, or the like. Therefore, the band of the cable 320, at which the signal can be transmitted, can be limited to an upper limit frequency Fth or less. The upper limit frequency Fth may be 148.5 MHz. A signal quality in the serial communication can be ensured by performing the signal transmission via the cable 320 at the upper limit frequency Fth or less.

The cable 320 may be a coaxial cable when transmitting the single-ended signal. Accordingly, the connector 307 of the vehicular camera 100 and the connector 327 of the cable 320 may be coaxial connectors.

The cable 320 may be a twisted pair cable when transmitting the differential signal. The cable 320 may be a twisted pair cable conforming to a car camera bus (C2B) (registered trademark) standard. Accordingly, the connector 307 of the vehicular camera 100 and the connector 327 of the cable 320 may be connectors for the twisted pair cable. FIGS. 13 and 14 illustrate the configuration when the cable 320 transmits the differential signal.

The connector 307 illustrated in FIG. 13 includes a hollow portion 307a. The connector 307 includes a plurality of connection terminals 371, 372, 373, and 374 in the hollow portion 307a. Each of the connection terminals 371, 372, 373, and 374 may be a convex connection terminal. The connection terminals 371, 372, 373, and 374 protrude from a bottom surface 307a1 of the hollow portion 307a toward the −Z side.

The connector 327 of the cable 320 illustrated in FIG. 14 may be inserted into the hollow portion 307a of the connector 307. The connector 327 includes a plurality of connection terminals 321 to 324. The connection terminals 321, 322, 323, and 324 of the connector 327 correspond to the connection terminals 371, 372, 373, and 374 of the connector 307, respectively. Each of the connection terminals 321 to 324 may be a concave connection terminal that can be fitted to a corresponding connection terminal (for example, the convex connection terminal illustrated in FIG. 13).

The cable 320 includes a plurality of communication lines CL1 to CL4 corresponding to the plurality of connection terminals 321, 322, 323, and 324, respectively. The camera ECU 310 includes a central processing unit (CPU) 311, a decoder 312, and a main power supply 313. The communication lines CL1 and CL2 connect the vehicular camera 100 and the decoder 312, and respectively transmit differential signals SIG+ and SIG− between the vehicular camera 100 and the decoder 312. The communication lines CL3 and CL4 connect the vehicular camera 100 and the main power supply 313, and respectively transmit a ground potential GND and a power supply potential PWR from the main power supply 313 to the vehicular camera 100.

The vehicular camera 100 includes an oscillator 306, an encoder 308, and a power supply circuit 309 in addition to the lens unit 302, the image capturing element 303, the ISP 304, the nonvolatile memory 305, and the connector 307. The image capturing element 303 includes a pixel array 303a and a peripheral circuit 303b.

Further, the oscillator 306, the encoder 308, and the power supply circuit 309 may be mounted on the circuit board 334 (see FIG. 13) as the image capturing element 303, and may be mounted on the circuit board 335 (not shown).

The connector 307 includes the plurality of connection terminals 371 to 374. Among the plurality of connection terminals 371 to 374, the connection terminals 371 and 372 constitute a differential pair, and function as terminals used for differential signals with mutually reverse phases. Each of the connection terminals 371 and 372 is electrically connected to the ISP 304 via the encoder 308. The connection terminal 373 functions as a ground terminal, and the connection terminal 374 functions as a power supply terminal. Each of the connection terminals 373 and 374 is electrically connected to the power supply circuit 309.

The power supply circuit 309 receives the ground potential GND and the power supply potential PWR via the connection terminals 373 and 374 of the connector 307. The power supply circuit 309 is connected to the oscillator 306, the image capturing element 303, the ISP 304, the nonvolatile memory 305, and the encoder 308 via a power supply line. The power supply circuit 309 can supply electric power to each of the oscillator 306, the image capturing element 303, the ISP 304, the nonvolatile memory 305, and the encoder 308 via the power supply line.

The optical axis AX of the lens unit 302 intersects the pixel array 303a of the image capturing element 303.

Figure 15:
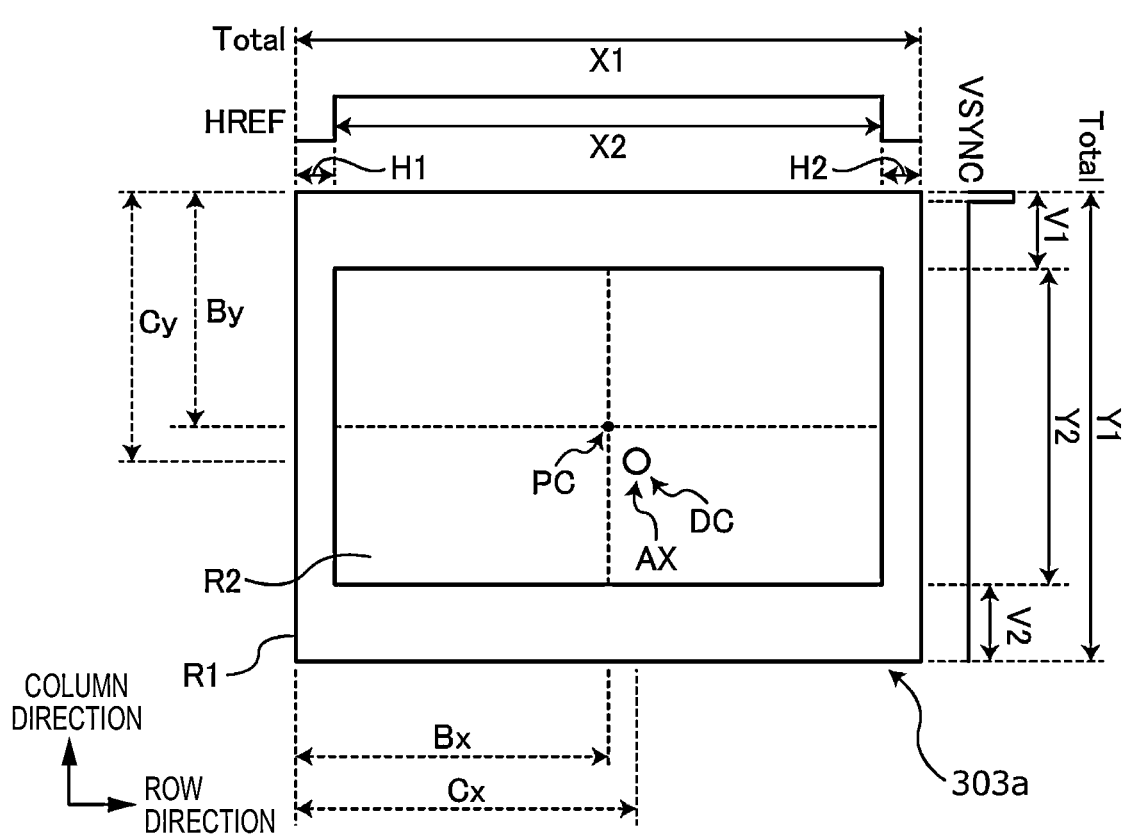
FIG. 15 is a diagram illustrating an effective pixel region and a recording pixel region of a pixel array according to the another embodiment.

In the pixel array 303a of the image capturing element 303, as illustrated in FIG. 15, a plurality of pixels are arranged to form a plurality of rows and a plurality of columns. FIG. 15 is a diagram illustrating an effective pixel region R1 and a recording pixel region R2 of the pixel array 303a. A direction along the rows is referred to as a row direction, and a direction along the columns is referred to as a column direction. The row direction and the column direction may be orthogonal to each other, and may intersect with each other at a predetermined angle (for example, 89° to 91°). The row direction is also referred to as a horizontal direction. The column direction is also referred to as a vertical direction.

FIG. 15 illustrates the pixel array 303a in which pixels of Y1 columns×X1 rows are arranged. A region corresponding to the entire pixel array 303a is referred to as the effective pixel region R1. In the effective pixel region R1, X1 pixels are arranged in the row direction and Y1 pixels are arranged in the column direction. The X1 and the Y1 are natural numbers. The effective pixel region R1 has a first quadrilateral shape. The first quadrilateral shape may be a first rectangle whose longitudinal direction is the row direction. In this case, for example, the X1 may be 1572 and the Y1 may be 1016.

The peripheral circuit 303b illustrated in FIG. 14 is connected to the oscillator 306 via a control line 361 and can receive a timing signal via the control line 361.

The ISP 304 is connected to the peripheral circuit 303b via a control line 341 and is connected to the encoder 308 via a control line 344. The control line 344 may support an inter-integrated circuit (I2C) method. The ISP 304 and the encoder 308 may mutually establish communication with a connection destination via the control line 344 according to the I2C method. The ISP 304 generates a synchronization signal and a control signal, supplies these signals to the peripheral circuit 303b via the control line 341, and supplies these signals to the encoder 308 via the control line 344 according to the I2C method. The synchronization signal includes a horizontal synchronization signal HREF, a vertical synchronization signal Vsync, and a pixel clock PCLK. The control signal includes the numbers of vertical blanking pixels V1 and V2.

Here, the vehicular camera 100 obtains, for example, a moving image and transfers the moving image to a vehicle 400 side (a camera ECU 310 side) via the cable 320, but is required to satisfy a predetermined frame rate according to a specification of the vehicle 400. As described above, the band of the cable 320, at which the signal can be transmitted, can be limited to the upper limit frequency Fth or less. For example, when an image of the effective pixel region R1 is transmitted to the vehicle 400 side via the cable 320 at a rate equal to or lower than the upper limit frequency Fth, the data amount of the image is too large, and it tends to be difficult to satisfy the predetermined frame rate.

Therefore, the ISP 304 can control the peripheral circuit 303b to output a signal of an output image corresponding to the recording pixel region R2 in the effective pixel region R1. The recording pixel region R2 is a region inside the effective pixel region R1 and is a partial region of the effective pixel region R1. The peripheral circuit 303b can drive the pixel array 303a such that a pixel signal is selectively output from the recording pixel region R2 in response to the timing signal from the oscillator 306, the synchronization signal (the horizontal synchronization signal HREF, the vertical synchronization signal Vsync, and the pixel clock PCLK) from the ISP 304, and the control signal (the numbers of vertical blanking pixels V1 and V2).

For example, the recording pixel region R2 illustrated in FIG. 15 can be defined according to the horizontal synchronization signal HREF, the vertical synchronization signal Vsync, the numbers of vertical blanking pixels V1 and V2, and the like.

The recording pixel region R2 is a region inside the effective pixel region R1 in the pixel array 303a. In the recording pixel region R2, X2 pixels are arranged in the row direction and Y2 pixels are arranged in the column direction. The X2 and the Y2 are natural numbers. Each of the X2 and the Y2 can be experimentally determined in advance according to the upper limit frequency Fth at which the signal can be transmitted by the cable 320.

The peripheral circuit 303b sequentially selects a plurality of pixel rows and performs reading and scanning for reading pixel signals from pixels of each column included in the selected pixel rows according to the horizontal synchronization signal HREF, the vertical synchronization signal Vsync, the pixel clock PCLK, and the numbers of vertical blanking pixels V1 and V2.

For example, the peripheral circuit 303b starts the reading and scanning from a first row according to a rising edge of the vertical synchronization signal Vsync. The peripheral circuit 303b counts row numbers of the selected pixel rows. The peripheral circuit 303b skips the first to V1-th rows according to the number of vertical blanking pixels V1. The peripheral circuit 303b sequentially selects pixels in the (V1+1)-th row from left to right of FIG. 15 according to the pixel clock PCLK, and starts to output pixel signals of the selected pixels to a signal line 342 when the horizontal synchronization signal HREF changes from a non-active level (for example, an L level) to an active level (for example, an H level). The peripheral circuit 303b further sequentially selects the pixels in the (V1+1)-th row according to the pixel clock PCLK, and stops the output of the pixel signals to the signal line 342 when the horizontal synchronization signal HREF changes from the active level to the non-active level. When the pixels in the (V1+1)-th row are selected to a right end according to the pixel clock PCLK, the peripheral circuit 303b counts up the row number to (V1+2) and starts to select pixels in the (V1+2)-th row from left according to the pixel clock PCLK. Thereafter, the same operation is repeated until the (V1+Y2)-th row. When pixels in the (V1+Y2)-th row are selected to the right end according to the pixel clock PCLK, the peripheral circuit 303b counts up the row number to (V1+Y2+1), skips to the (V1+Y2+1)-th row to the Y1-th row according to the number of vertical blanking pixels V2 (=Y1−(V1+Y2)), and ends the reading and scanning.

The X2 is smaller than the X1, and the following Formula 1 holds.

$$X1 = H1 + X2 + H2 \qquad \text{Formula 1}$$

In Formula 1, the H1 refers to the number of horizontal blanking pixels on the left side of the recording pixel region R2 in FIG. 15. The H2 refers to the number of horizontal blanking pixels on the right side of the recording pixel region R2 in FIG. 15.

The number of horizontal blanking pixels H1 corresponds to the number of pixel clocks during a horizontal blanking period in which the horizontal synchronization signal HREF is maintained at the L level before changing to the H level. The number of horizontal blanking pixels H2 corresponds to the number of pixel clocks during a horizontal blanking period in which the horizontal synchronization signal HREF is maintained at the L level after changing from the H level to the L level.

The Y2 is smaller than the Y1, and the following Formula 2 holds.

$$Y1 = V1 + Y2 + V2 \qquad \text{Formula 2}$$

In Formula 2, the V1 refers to the number of vertical blanking pixels on the upper side of the recording pixel region R2 in FIG. 15. The V2 refers to the number of vertical blanking pixels on the lower side of the recording pixel region R2 in FIG. 15.

The number of vertical blanking pixels V1 corresponds to the number of vertical blanking rows in which reading of pixel signals is skipped from a rising edge timing of the vertical synchronization signal Vsync. The number of vertical blanking pixels V2 corresponds to the number of vertical blanking rows in which reading of pixel signals is skipped after reading of pixel signals in the (V1+Y2)-th row is completed.

The recording pixel region R2 has a second quadrilateral shape. The second quadrilateral shape may be a second rectangle. In this case, for example, the X2 may be 1280 and the Y2 may be 960.

A position of the recording pixel region R2 in the effective pixel region R1 can be set such that a center PC of the recording pixel region R2 substantially coincides with a center of the effective pixel region R1. At this time, the following Formula 3 holds.

$$H1 = H2, V1 = V2 \qquad \text{Formula 3}$$

The position in the effective pixel region R1 can be represented by pixel coordinates. The pixel coordinates are represented by (a row number, a column number). A position of a pixel at the upper left corner of the effective pixel region R1 in FIG. 15 is set as an origin (1, 1) of the pixel coordinates.

Pixel coordinates (Bx, By) of the center PC of the recording pixel region R2 substantially coincide with that of the center of the effective pixel region R1, and can be set to satisfy the following Formula 4.

$$Bx = X1/2, By = Y1/2 \qquad \text{Formula 4}$$

On the other hand, the optical axis AX of the lens unit 302 intersects at a position deviated from the center of the effective pixel region R1, and intersects at a position deviated from the center PC of the recording pixel region R2. As described above, the lens 302a of the lens unit 302 has the distortion aberration, and can form a subject image that is distorted in a barrel form or a pincushion form in the effective pixel region R1. A distortion center DC of the subject image is located at the position deviated from the center of the effective pixel region R1 and the position deviated from the center PC of the recording pixel region R2.

The position of the distortion center DC is stored in the nonvolatile memory 305 in a nonvolatile manner. The position of the distortion center DC is represented by pixel coordinates (Cx, Cy) of the distortion center DC. The pixel coordinates (Cx, Cy) of the distortion center DC satisfy the following Formula 5.

$$Cx \neq Bx, Cy \neq By \qquad \text{Formula 5}$$

The pixel array 303a illustrated in FIG. 14 is connected to the ISP 304 via the signal line 342.

The ISP 304 can receive a plurality of pixel signals output from the recording pixel region R2 in the pixel array 303a via the signal line 342. The ISP 304 performs a predetermined process on the plurality of pixel signals to generate image information on the recording pixel region R2. The image information can include a signal of any color system, for example, a YUV signal. The YUV signal includes a Y signal indicating a luminance component, a U signal indicating a color difference between the luminance component and a blue component, and a V signal indicating a color difference between the luminance component and a red component. Regarding the YUV signal, any data format in a YUV form can be adopted, and the YUV 422 format may be adopted. In the YUV 422 format, signals of two adjacent pixels are set as one set and share a part of information, and thus it is possible to reduce the data amount while preventing the image quality deterioration.

The ISP 304 is connected to the encoder 308 via a data bus 343 of a multi-bit width (for example, 8-bit width). The data bus 343 may support the I2C method. The ISP 304 and the encoder 308 may mutually establish communication with the connection destination via the data bus 343 according to the I2C method. The ISP 304 can transfer the image information on the recording pixel region R2 as a parallel signal of a plurality of bits (for example, 8 bits) to the encoder 308 via a bus wiring according to the I2C method.

The encoder 308 receives the image information on the recording pixel region R2 as the parallel signal. The encoder 308 performs parallel-serial conversion on the image information on the recording pixel region R2, and converts the image information on the recording pixel region R2 into a serial signal. The encoder 308 differentiates the serial signal to generate the differential signals SIG+ and SIG−, and outputs these signals to the decoder 312 of the camera ECU 310 via the connector 307 and the cable 320.

The nonvolatile memory 305 is connected to the ISP 304 via a control line 351. The control line 351 may support a serial peripheral interface (SPI) method. The ISP 304 and the nonvolatile memory 305 may mutually establish communication with a connection destination via the control line 351 according to the SPI method.

For example, the ISP 304 stores information on the position of the distortion center DC in the nonvolatile memory 305 via the control line 351. The position of the distortion center DC may include the pixel coordinates (Cx, Cy) of the distortion center DC. The ISP 304 reads the position of the distortion center DC from the nonvolatile memory 305 via the control line 351.

The ISP 304 is connected to the encoder 308 via a control line 345. The control line 345 may support the I2C method. The ISP 304 and the encoder 308 may mutually establish communication with a connection destination via the control line 345 according to the I2C method. The ISP 304 can exchange the serial signal with the encoder 308 according to the I2C method.

For example, the ISP 304 receives a serial signal indicating the information on the position of the distortion center DC from the encoder 308 via the control line 345. The ISP 304 supplies the serial signal indicating the information on the position of the distortion center DC to the encoder 308 via the control line 345.

The encoder 308 receives the serial signal indicating the information on the position of the distortion center DC from the ISP 304. The encoder 308 may transmit the image information on the recording pixel region R2 and the information on the position of the distortion center DC to the camera ECU 310 in a time division manner according to a serial communication (for example, C2B (registered trademark)) standard. The encoder 308 may add the serial signal indicating the information on the position of the distortion center DC before or after the serial signal indicating the image information on the recording pixel region R2. The encoder 308 can differentiate the serial signal indicating the information on the position of the distortion center DC to generate the differential signals SIG+ and SIG−, and output these signals to the decoder 312 of the camera ECU 310 via the connector 307 and the cable 320.

Upon receiving the serial signal indicating the information on the position of the distortion center DC from the camera ECU 310 via the cable 320, the encoder 308 can transfer the serial signal indicating the information on the position of the distortion center DC to the ISP 304 via the control line 345.

Figure 16:
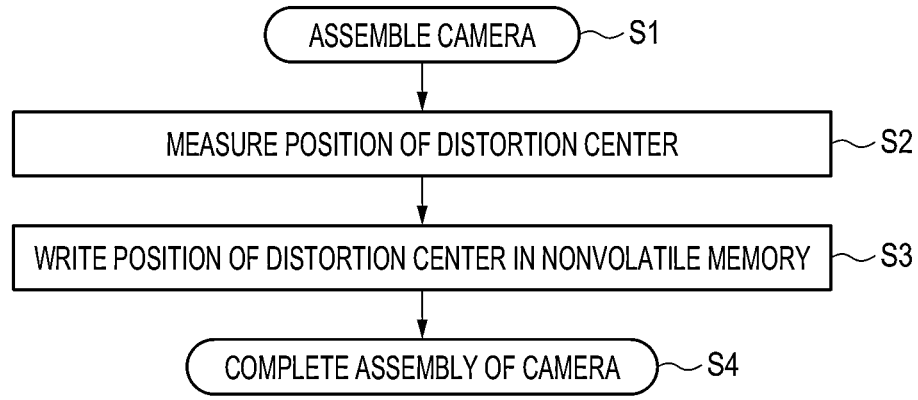
FIG. 16 is a flowchart illustrating a manufacturing method of the vehicular camera according to the another embodiment.

Next, the manufacturing method of the vehicular camera 100 will be described with reference to FIG. 16. FIG. 16 is a flowchart illustrating the manufacturing method of the vehicular camera 100.

The vehicular camera 100 is assembled (S1). For example, the housing 331 and the connector 307 are produced. The image capturing element 303, the ISP 304, and the nonvolatile memory 305 are mounted on the circuit board 334. Further, the oscillator 306, the encoder 308, and the power supply circuit 309 can be mounted on the circuit board 334. The circuit board 334 is attached inside the housing 331. Thereafter, adjustment of the optical axis AX of the lens unit 302, adjustment of a focus position of the lens unit 302, tilt adjustment of the lens unit 302, and the like are performed, and relative attachment positions of the barrel 302b of the lens unit 302 and the housing 331 are adjusted. When the attachment positions are determined, the barrel 302b of the lens unit 302 is bonded to the housing 331 with an adhesive or the like, and the vehicular camera 100 is assembled.

The position of the distortion center DC of the lens unit 302 is measured (S2). For example, a test device (not shown) is connected to the connector 307. For example, an image of a lattice-like test pattern is captured by the image capturing element 303, and an image of the effective pixel region R1 (see FIG. 15) captured by the image capturing element 303 is transferred to the test device via the ISP 304, the encoder 308, and the connector 307. The test device may include a monitor screen, and the transferred image of the effective pixel region R1 may be displayed on the monitor screen. The lattice-like test pattern in the image of the effective pixel region R1 can be distorted in a barrel form or a pincushion form. The test device measures the position of the distortion center DC in the effective pixel region R1. The test device may obtain, as the position of the distortion center DC, a position of the pixel coordinates (Cx, Cy) at which the curvature of the distortion of the lattice-like test pattern becomes substantially zero in the row direction and the column direction in the effective pixel region R1.

The position of the distortion center DC is written in the nonvolatile memory 305 (S3). For example, the test device writes a measurement result of the position of the distortion center DC in the nonvolatile memory 305 via the connector 307, the encoder 308, and the ISP 304. Information on the position of the pixel coordinates (Cx, Cy) of the distortion center DC may be written in the nonvolatile memory 305.

Upon receiving a write completion notification from the nonvolatile memory 305 via the ISP 304, the encoder 308, and the connector 307, the test device is removed from the connector 307.

Accordingly, the assembly of the vehicular camera 100 is completed (S4). Thereafter, the connector 307 is connected to the camera ECU 310 via the cable 320, and the connector 307 is connected to the vehicle body 201 via the fixing member. Accordingly, the vehicular camera 100 is electrically and mechanically provided in the vehicle 400.

Figure 17:
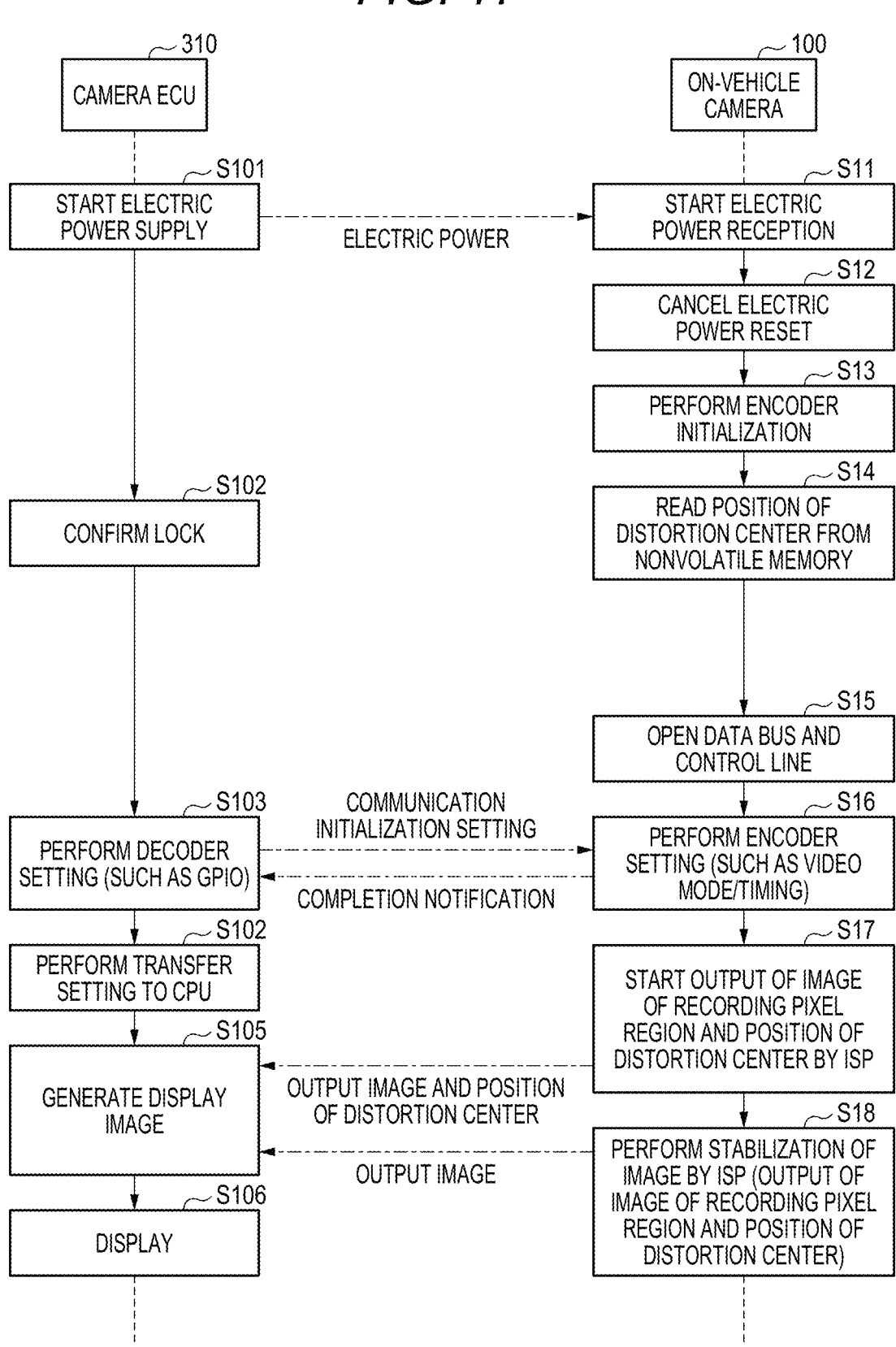
FIG. 17 is a flowchart illustrating an operation of the vehicular camera according to the another embodiment.

Next, an operation of the vehicular camera 100 will be described with reference to FIG. 17. FIG. 17 is a flowchart illustrating the operation of the vehicular camera 100.

The camera ECU 310 recognizes that power supply activation of the vehicular camera 100 is requested in response to satisfaction of a predetermined condition, and starts electric power supply to the vehicular camera 100 (S101). The predetermined condition may be the matter that the power supply activation request related to the vehicular camera 100 is received from a host controller (for example, an ECU that controls the entire vehicle 400), or the matter that the electric power received from a battery or a power conversion device reaches a predetermined threshold value. Upon receiving the electric power from the battery or the power conversion device, the camera ECU 310 generates electric power for the vehicular camera 100 by using the power, and starts to supply the electric power to the vehicular camera 100 as the ground potential GND and the power supply potential PWR via the communication lines CL3 and CL4.

Accordingly, the power supply circuit 309 of the vehicular camera 100 starts to receive the electric power from the camera ECU 310 (S11), and enters a reset state.

In the camera ECU 310, when a level of the power supply potential PWR reaches a threshold value level and a predetermined time elapses, the main power supply 313 locks control of the level of the power supply potential PWR, and the CPU 311 confirms the locking (S102).

In the vehicular camera 100, when the level of the power supply potential PWR reaches the threshold value level and the predetermined time elapses, the power supply circuit 309 cancels the reset state (S12) and starts electric power supply to the respective parts.

The encoder 308 performs initialization in response to the start of the electric power supply from the power supply circuit 309 (S13). The encoder 308 sets values of various parameters to initial values. For example, the encoder 308 sets a communication parameter such as a video mode and a timing to an initial value.

The ISP 304 establishes communication with the nonvolatile memory 305 via the control line 351 in response to the start of the electric power supply from the power supply circuit 309. The ISP 304 may establish the communication with the nonvolatile memory 305 via the control line 351 according to the SPI method. The ISP 304 reads the information on the position of the distortion center DC from the nonvolatile memory 305 via the control line 351 (S14). The ISP 304 stores the information on the position of the distortion center DC.

The ISP 304 establishes communication with the encoder 308 via the data bus 343 and the control lines 344 and 345. The ISP 304 may establish the communication with the encoder 308 via the data bus 343 and the control lines 344 and 345 according to the I2C method. Accordingly, the data bus 343 and the control lines 344 and 345 are opened (S15).

In the camera ECU 310, the decoder 312 performs a setting for communicating with the vehicular camera 100 (S103). For example, the decoder 312 assigns terminals 312a and 312b of a general purpose input output (GPIO), to which the communication lines CL1 and CL2 are respectively connected, to terminals for serial communication with the vehicular camera 100. The decoder 312 transmits a parameter for communication initialization setting to the encoder 308 via the terminals 312a and 312b, the communication lines CL1 and CL2, the connection terminals 321 and 322, and the connection terminals 371 and 372. The parameter for communication initialization setting includes a setting value of the communication parameter such as the video mode and the timing.

In the vehicular camera 100, upon receiving the parameter for communication initialization setting, the encoder 308 sets the communication parameter based on the parameter for communication initialization setting (S16). For example, the encoder 308 changes a value of the parameter for communication initialization setting such as the video mode and the timing from the initial value to the setting value included in the parameter for communication initialization setting. When the setting is completed, the encoder 308 transmits a completion notification to the decoder 312 via the connection terminals 371 and 372, the connection terminals 321 and 322, the communication lines CL1 and CL2, and the terminals 312a and 312b.

In the camera ECU 310, the decoder 312 receives the completion notification. Accordingly, the communication between the encoder 308 and the decoder 312 via the cable 320 can be established.

The decoder 312 establishes communication with the CPU 311 in the camera ECU 310. The decoder 312 may establish the communication with the CPU 311 according to a mobile industry processor interface (MIPI) method. When the communication with the CPU 311 is established, the decoder 312 sets a parameter for transferring an image received from the vehicular camera 100 to the CPU 311 (S104). The parameter for transfer may include a value of a frame rate. A frame rate for the transfer between the decoder 312 and the CPU 311 is higher than a frame rate for the communication between the decoder 312 and the encoder 308 via the cable 320.

Figure 18A:
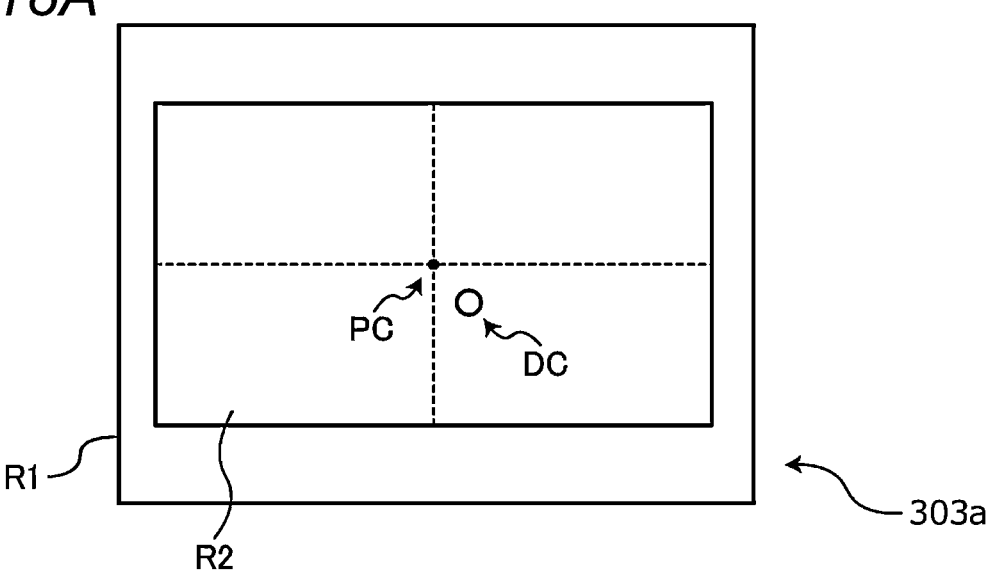
FIGS. 18A to 18C are diagrams illustrating the operation of the vehicular camera according to the another embodiment.
Figure 18B:
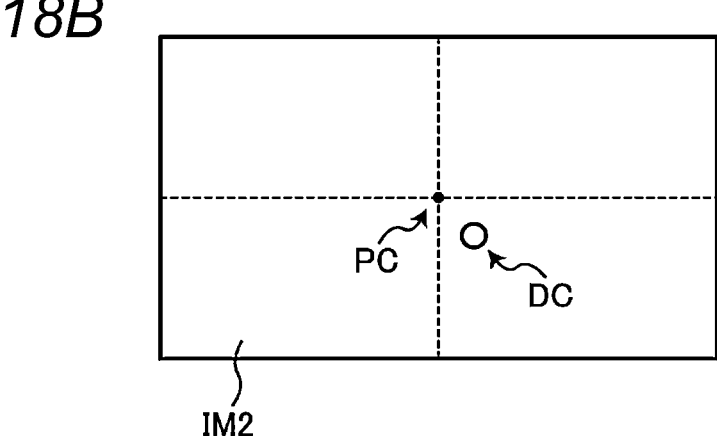
Figure 18C:
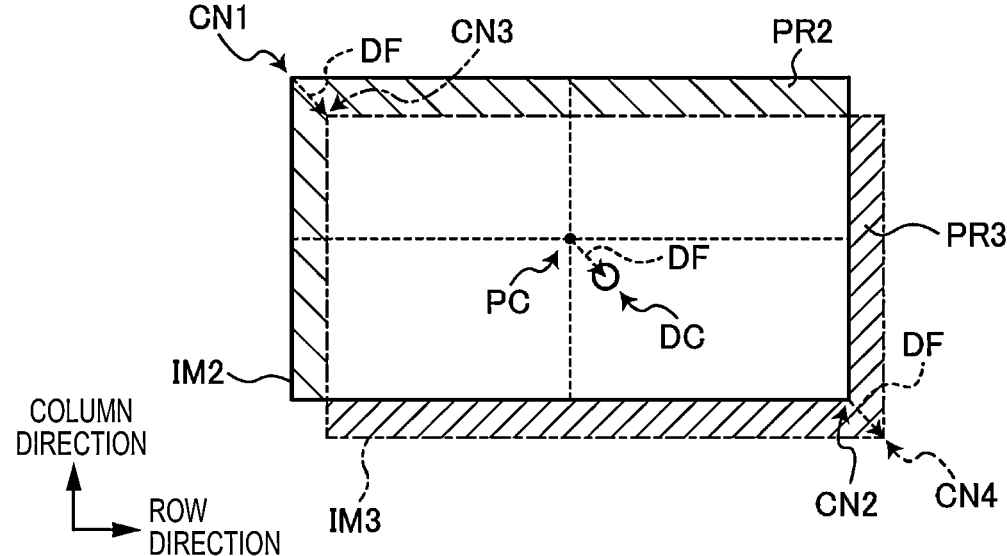

In the vehicular camera 100, the ISP 304 controls the image capturing element 303 to start an image capturing operation. Accordingly, as illustrated in FIG. 18A, the image capturing element 303 obtains the subject image in the effective pixel region R1 corresponding to the entire pixel array 303a, and selectively outputs the pixel signals from the recording pixel region R2 which is a part of the effective pixel region R1. FIGS. 18A to 18C are diagrams illustrating the operation of the vehicular camera 100. The position of the center PC of the recording pixel region R2 is deviated from the position of the distortion center DC.

The ISP 304 obtains the signals of the recording pixel region R2 from the image capturing element 303. The ISP 304 performs the predetermined process on the signals of the recording pixel region R2 to generate an image IM2 of the recording pixel region R2 as illustrated in FIG. 18B. The position of the center PC in the image IM2 corresponds to the position of the center PC in the recording pixel region R2. The position of the center PC in the image IM2 is deviated from the position of the distortion center DC in the image IM2. The ISP 304 starts to output the image (the output image) IM2 of the recording pixel region R2 and the position of the distortion center DC to the camera ECU 310 via the encoder 308, the connector 307, and the cable 320 (S17).

In the camera ECU 310, the CPU 311 receives the image (the output image) IM2 of the recording pixel region R2 and the position of the distortion center DC from the vehicular camera 100 via the cable 320 and the decoder 312. The CPU 311 generates a display image to be output to the predetermined display device by using the image (the output image) IM2 of the recording pixel region R2 and the position of the distortion center DC (S105). The predetermined display device may be the display 202 (see FIG. 11).

For example, the position of the center PC of the recording pixel region R2 is set in the camera ECU 310 in advance. The position of the center PC of the recording pixel region R2 corresponds to a pixel position of the center PC of the recording pixel region R2 in the effective pixel region R1.

Upon receiving the image IM2 of the recording pixel region R2 and the position of the distortion center DC, the CPU 311 obtains the position of the center PC of the recording pixel region R2. The CPU 311 generates a display image IM3 as illustrated in FIG. 18C according to the image IM2 of the recording pixel region R2, the position of the distortion center DC, and the position of the center PC. The display image IM3 is an image having the distortion center DC as a center and the same number of pixels (X2×Y2 illustrated in FIG. 15) as that of the recording pixel region R2.

The CPU 311 uses the image IM2 to perform an arithmetic process for obtaining the image having the distortion center DC as the center and the same number of pixels as that of the recording pixel region R2. For example, the CPU 311 obtains a difference DF between the pixel position of the center PC and a pixel position of the distortion center DC in the effective pixel region R1. The CPU 311 sets, as an upper left corner CN3 of the display image IM3, a pixel position obtained by shifting an upper left corner CN1 of the recording pixel region R2 in FIG. 18C by the difference DF. The CPU 311 sets, as a lower right corner CN4 of the display image IM3, a pixel position obtained by shifting a lower right corner CN2 of the recording pixel region R2 in FIG. 18C by the difference DF. Accordingly, the CPU 311 generates the display image IM3 defined by the corner CN3 and the corner CN4.

That is, the CPU 311 generates the display image IM3 by deleting a partial region PR2 from the image IM2 and adding a partial region PR3. The display image IM3 is shown by being surrounded with a chain line in FIG. 18C. The partial region PR2 is indicated by hatching with a large pitch in FIG. 18C. The partial region PR3 is indicated by hatching with a small pitch in FIG. 18C. During the generation of the display image IM3, the CPU 311 may interpolate a pixel value of a single color (blue, gray, or the like) indicating that the image information is missing in the partial region PR3.

In the vehicular camera 100, the ISP 304 performs a predetermined process on the image IM2 and continues to output the image IM2 of the recording pixel region R2 while stabilizing the image IM2 (S18). The predetermined process includes an exposure adjustment, a white balance adjustment, a gain adjustment, a gamma correction, and the like.

In the camera ECU 310, the CPU 311 supplies the display image IM3 to the predetermined display device (for example, the display 202) in response to the stabilization of the image IM2 from the vehicular camera 100. The predetermined display device displays the display image IM3 (S106).

As described above, according to the another embodiment, the vehicular camera 100 reads the position of the distortion center DC from the nonvolatile memory 305 in response to the activation of the image capturing element 303, and outputs the output image of the recording pixel region R2 as a part of the effective pixel region R1 and the position of the distortion center DC to the camera ECU 310 via the cable 320. Accordingly, the output image can be transmitted to the camera ECU 310 via the cable 320 at the rate equal to or lower than the upper limit frequency Fth, and the predetermined frame rate required for the vehicular camera 100 can be satisfied. Further, the position of the distortion center DC can be transmitted to the camera ECU 310 in addition to the output image, and thus the camera ECU 310 can generate the display image IM3 having the distortion center DC as the center and the same number of pixels (for example, X2×Y2) as that of the recording pixel region R2. As a result, the predetermined frame rate required for the vehicular camera 100 can be satisfied, and the display image in which the position of the distortion center DC is appropriately adjusted can be displayed on the predetermined display device (for example, the display 202).

Next, the vehicular camera 100 according to a still another embodiment will be described. Hereinafter, parts different from the another embodiment described above will be mainly described.

According to the another embodiment, the configuration and the operation in which the image IM2 of the recording pixel region R2 and the position of the distortion center DC are transmitted from the vehicular camera 100 to the vehicle 400 side in a state in which the centers of the image IM2 of the recording pixel region R2 and the position of the distortion center DC are deviated from each other are described. On the other hand, according to the present embodiment, a configuration and an operation in which the image IM2 of the recording pixel region R2 and the position of the distortion center DC are transmitted to the vehicle 400 side in a state in which the centers thereof are aligned are described.

Figure 19:
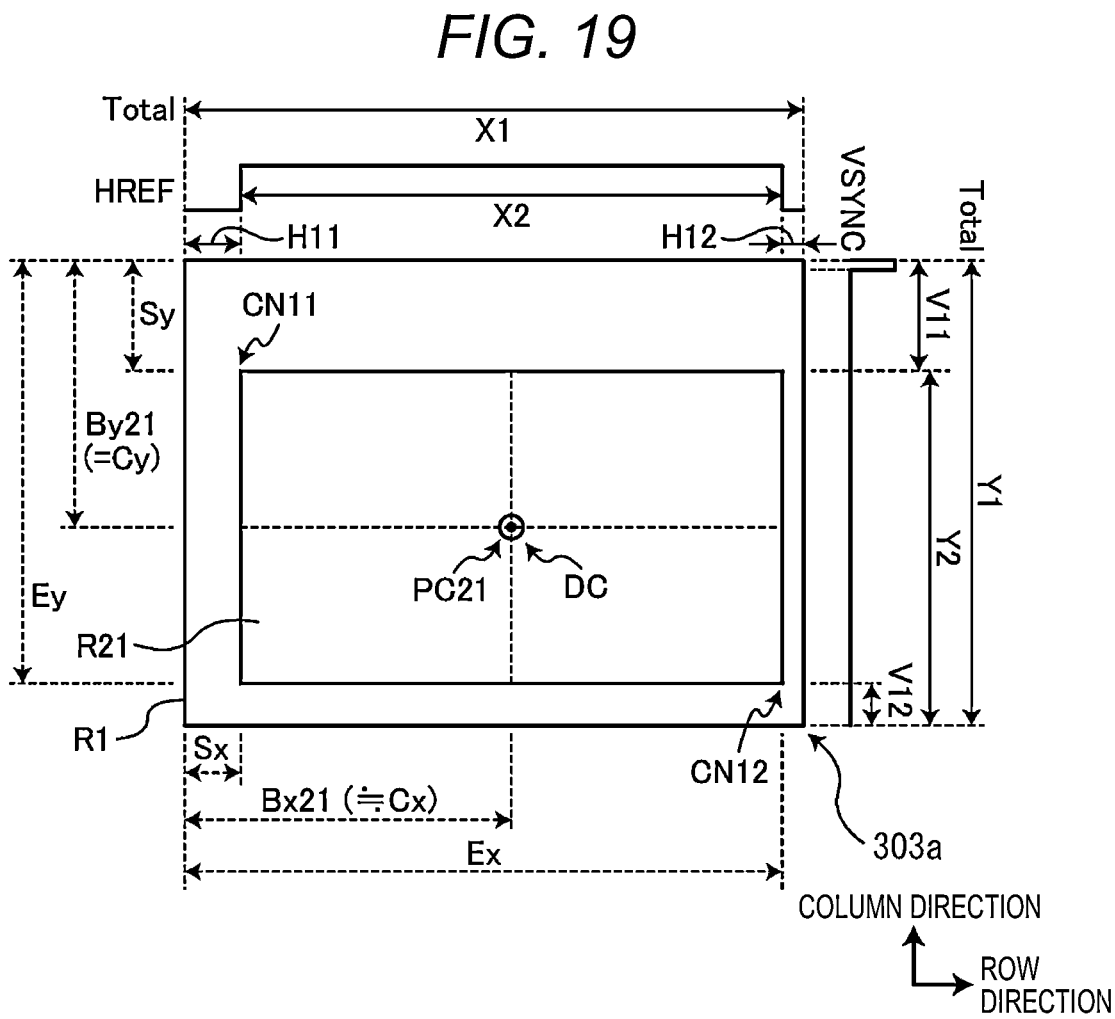
FIG. 19 is a diagram illustrating an effective pixel region and a recording pixel region of a pixel array according to a still another embodiment.

In the vehicular camera 100, the nonvolatile memory 305 stores a position of a recording pixel region R21 as illustrated in FIG. 19 instead of the position of the distortion center DC. FIG. 19 is a diagram illustrating the effective pixel region R1 and the recording pixel region R21 of the pixel array 303a. A position of the recording pixel region R21 may be a position of the recording pixel region R21 in the effective pixel region R1.

A center PC21 of the recording pixel region R21 substantially coincides with the distortion center DC. The pixel coordinates of the distortion center DC are represented by (Cx, Cy). The recording pixel region R21 can be set such that pixel coordinates (Bx21, By21) of the center PC21 satisfy the following Formula 6.

$$Bx21 \approx Cx, By21 \approx Cy \qquad \text{Formula 6}$$

A position of the center PC21 of the recording pixel region R21 is a position deviated from the position of the center of the effective pixel region R1. Accordingly, the following Formulas 7 to 9 hold.

$$X1 = H11 + X2 + H12 \qquad \text{Formula 7}$$

$$Y1 = V11 + Y2 + V12 \qquad \text{Formula 8}$$

$$H11 \neq H12, V11 \neq V12 \qquad \text{Formula 9}$$

In Formula 7, the H11 refers to the number of horizontal blanking pixels on the left side of the recording pixel region R21 in FIG. 19. The H12 refers to the number of horizontal blanking pixels on the right side of the recording pixel region R21 in FIG. 19. In Formula 8, the V11 refers to the number of vertical blanking pixels on the upper side of the recording pixel region R21 in FIG. 19. The V12 refers to the number of vertical blanking pixels on the lower side of the recording pixel region R21 in FIG. 19.

FIG. 19 illustrates a case in which the following Formula 10 holds.

$$H11 > H12, V11 > V12 \qquad \text{Formula 10}$$

An ISP 4 sets the position of the recording pixel region R21. The ISP 4 may set the position of the recording pixel region R21 by adjusting the horizontal synchronization signal HREF, the vertical synchronization signal Vsync, the numbers of vertical blanking pixels V11 and V12, and the like.

The position of the recording pixel region R21 is stored in the nonvolatile memory 305 in a nonvolatile manner. A pixel position of a location representing the recording pixel region R21 can be stored in the nonvolatile memory 305 as the position of the recording pixel region R21. Pixel positions of two corners in a diagonal direction can be stored in the nonvolatile memory 305 as the pixel position of the location representing the recording pixel region R21. For example, a pixel position of an upper left corner CN11 and a pixel position of a lower right corner CN12 in FIG. 19 may be stored in the nonvolatile memory 305.

The pixel position of the corner CN11 is represented by pixel coordinates (Sx, Sy) of the corner CN11. The pixel coordinates (Sx, Sy) of the corner CN11 satisfy the following Formula 11.

$$Sx = H11, Sy = V11 \qquad \text{Formula 11}$$

A pixel position of the corner CN12 is represented by pixel coordinates (Ex, Ey) of the corner CN12. The pixel coordinates (Ex, Ey) of the corner CN12 satisfy the following Formula 12.

$$Ex = H11 + X2 = X1 - H12, Ey = V11 + Y2 = Y1 - V12 \qquad \text{Formula 12}$$

At this time, the center PC21 of the recording pixel region R21 is a midpoint of a diagonal line connecting the corner CN11 and the corner CN12. Accordingly, a row number Bx21 of the pixel position of the center PC21 is an average value of a row number Sx of the pixel position of the corner CN11 and a row number Ex of the pixel position of the corner CN12. A column number By21 of the pixel position of the center PC21 is an average value of a column number Sy of the pixel position of the corner CN11 and a column number Ey of the pixel position of the corner CN12. That is, the following Formula 13 holds.

$$Bx21 = (Sx + Ex)/2, By21 = (Sy + Ey)/2 \qquad \text{Formula 13}$$

According to Formulas 6 and 13, the following Formula 14 holds with respect to the pixel coordinates (Cx Cy) of the distortion center DC.

$$Cx \approx (Sx + Ex)/2, Cy \approx (Sy + Ey)/2 \qquad \text{Formula 14}$$

As shown by Formula 14, a row number Cx of the pixel position of the distortion center DC is substantially equal to the average value of the row number Sx of the pixel position of the corner CN11 and the row number Ex of the pixel position of the corner CN12. A column number Cy of the pixel position of the center PC21 is substantially equal to the average value of the column number Sy of the pixel position of the corner CN11 and the column number Ey of the pixel position of the corner CN12.

Figure 20:
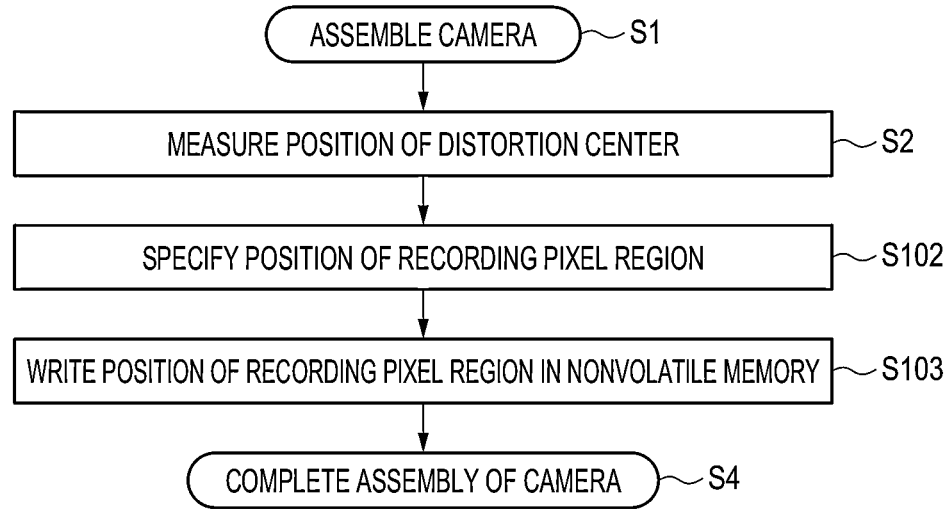
FIG. 20 is a flowchart illustrating a manufacturing method of a vehicular camera according to the still another embodiment.

Further, as illustrated in FIG. 20, the manufacturing method of the vehicular camera 100 is different from that of the another embodiment in the following points. FIG. 20 is a flowchart illustrating the manufacturing method of the vehicular camera 100.

After S1 and S2 are performed, the position of the recording pixel region R21 in the effective pixel region R1 is specified (S102). For example, the test device supplies the measurement result of the position of the distortion center DC to the ISP 4 via the connector 307 and the encoder 308 in the vehicular camera 100. The ISP 4 specifies the position of the recording pixel region R21 such that the center PC21 of the recording pixel region R21 substantially coincides with the distortion center DC according to the measurement result of the position of the distortion center DC. The specified position of the recording pixel region R21 may include the pixel positions of the two corners in the diagonal direction, and may include, for example, the pixel coordinates (Sx, Sy) of the corner CN11 and the pixel coordinates (Ex, Ey) of the corner CN12. The ISP 4 adjusts the horizontal synchronization signal HREF, the vertical synchronization signal Vsync, the numbers of vertical blanking pixels V11 and V12, and the like to define the specified position of the recording pixel region R21 (see FIG. 19).

The position of the recording pixel region R21 is written in the nonvolatile memory 305 (S103). For example, the ISP 4 writes the position of the recording pixel region R21 in the nonvolatile memory 305. The pixel positions of the two corners in the diagonal direction may be written in the nonvolatile memory 305, and for example, the pixel coordinates (Sx, Sy) of the corner CN11 and the pixel coordinates (Ex, Ey) of the corner CN12 may be written therein.

Upon receiving a write completion notification from the ISP 4 via the encoder 308 and the connector 307, the test device is removed from the connector 307.

Accordingly, the assembly of the vehicular camera 100 is completed (S4). Thereafter, the connector 307 is connected to the camera ECU 310 via the cable 320, and the connector 307 is connected to the vehicle body 201 via the fixing member. Accordingly, the vehicular camera 100 is electrically and mechanically provided in the vehicle 400.

Figure 21:
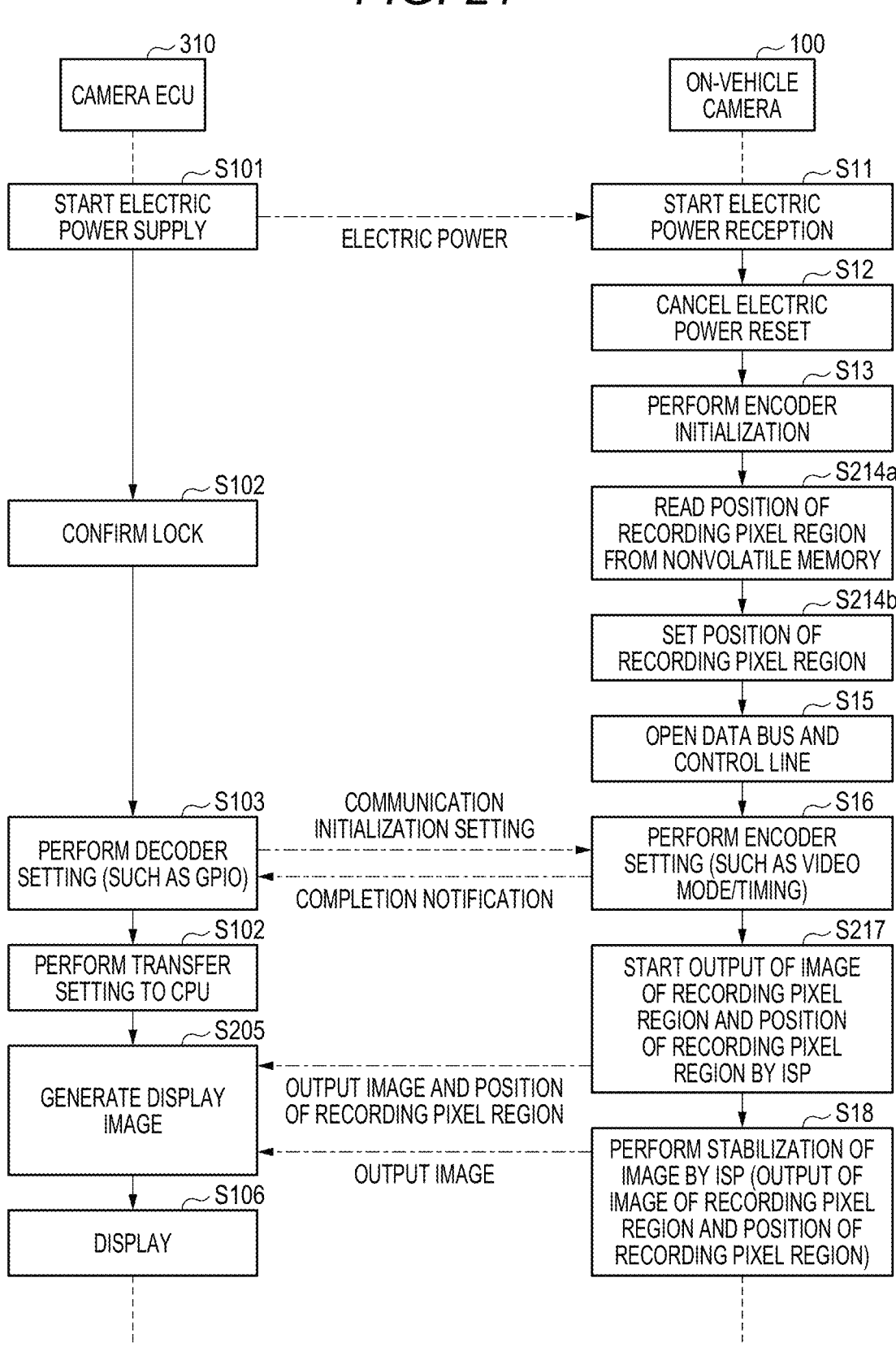
FIG. 21 is a flowchart illustrating an operation of the vehicular camera according to the still another embodiment.

Further, as illustrated in FIG. 21, the operation of the vehicular camera 100 is different from that of the another embodiment in the following points. FIG. 21 is a flowchart illustrating the operation of the vehicular camera 100.

After S101, S102, and S11 to S13 are performed in the same manner as in the another embodiment, in the vehicular camera 100, the ISP 4 establishes the communication with the nonvolatile memory 305 via a control line 51 in response to the start of the electric power supply from a power supply circuit 9. The ISP 4 reads information on the position of the recording pixel region R21 from the nonvolatile memory 305 (S214a). The ISP 4 stores the information on the position of the recording pixel region R21.

Figure 22A:
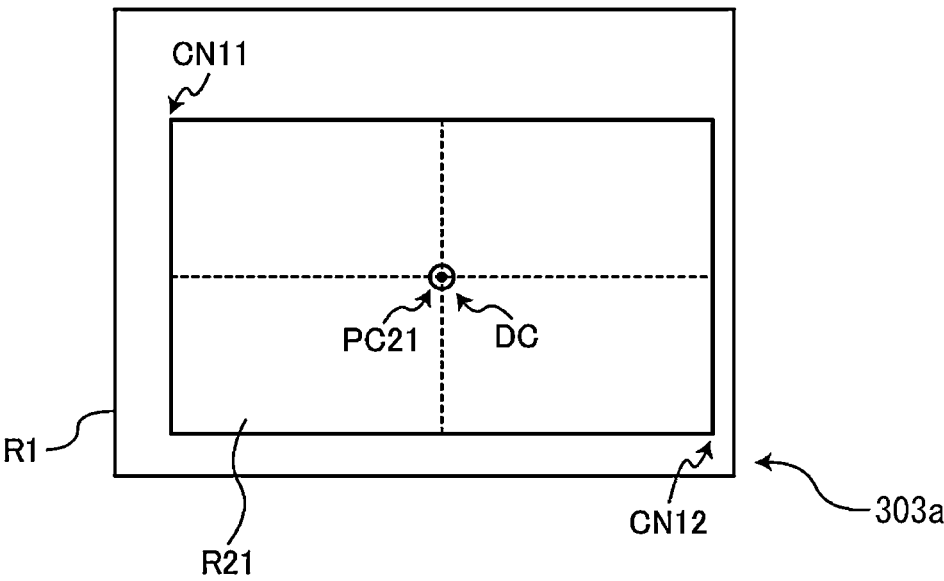
FIGS. 22A to 22C are diagrams illustrating the operation of the vehicular camera according to the still another embodiment.
Figure 22B:
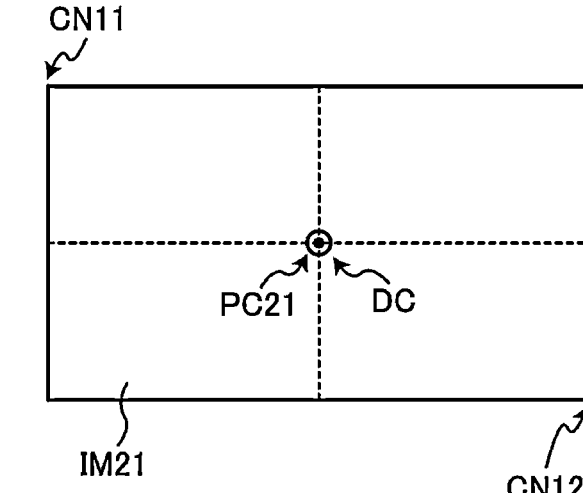
Figure 22C:
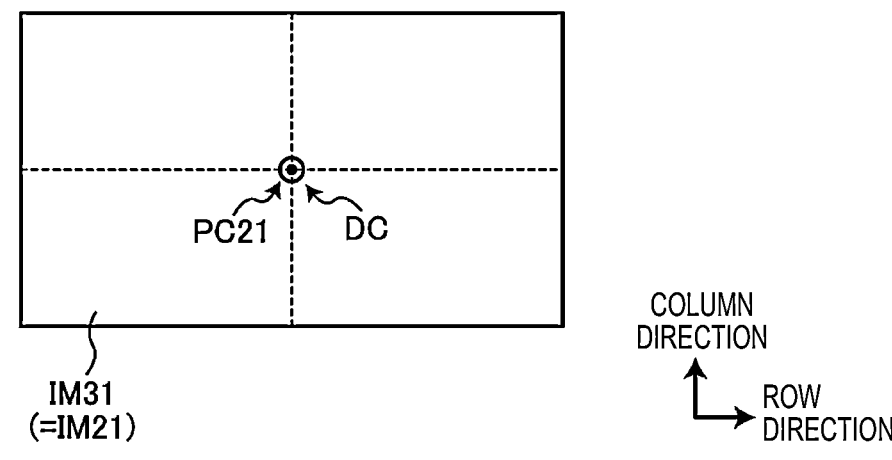

The ISP 4 sets the position of the recording pixel region R21 in the effective pixel region R1 of the pixel array 303a (S214b). The ISP 4 obtains the position of the recording pixel region R21 from the nonvolatile memory 305. The ISP 4 may obtain the pixel position of the location representing the recording pixel region R21 in the effective pixel region R1 as the position of the recording pixel region R21. The ISP 4 may obtain the pixel positions of the two corners in the diagonal direction as the pixel position of the location representing the recording pixel region R21. For example, the ISP 4 may obtain a pixel position of the upper left corner CN11 and a pixel position of the lower right corner CN12 in FIG. 22A. FIGS. 22A to 22C are diagrams illustrating the operation of the vehicular camera 100 according to the present embodiment.

The ISP 4 sets the position of the recording pixel region R21 to the position of the recording pixel region R21 read from the nonvolatile memory 305. The ISP 4 may set the position of the recording pixel region R21 by adjusting the horizontal synchronization signal HREF, the vertical synchronization signal Vsync, the numbers of vertical blanking pixels V11 and V12, and the like. Accordingly, as illustrated in FIG. 22A, the position of the recording pixel region R21 is set to a position at which the center PC21 thereof substantially coincides with the distortion center DC.

Thereafter, after S15, S103, and S16 are performed in the same manner as in the first embodiment, in the vehicular camera 100, the ISP 4 controls the image capturing element 303 to start the image capturing operation. Accordingly, as illustrated in FIG. 22A, the image capturing element 303 obtains the subject image in the effective pixel region R1 corresponding to the entire pixel array 303a, and selectively outputs pixel signals from the recording pixel region R21 which is a part of the effective pixel region R1. The position of the center PC21 of the recording pixel region R21 substantially coincides with the position of the distortion center DC.

The ISP 4 obtains the signals of the recording pixel region R21 from the image capturing element 303. The ISP 4 performs a predetermined processing on the signals of the recording pixel region R21 to generate an image IM21 of the recording pixel region R21 as illustrated in FIG. 22B. The position of the center PC21 in the image IM21 corresponds to the position of the center PC21 in the recording pixel region R21. The center PC21 in the image IM21 substantially coincides with the distortion center DC in the image IM21. The ISP 4 starts to output the image (the output image) IM21 of the recording pixel region R21 and the position of the recording pixel region R21 to the camera ECU 310 via the encoder 308, the connector 307, and the cable 320 (S217).

The ISP 4 can output the pixel position of the location representing the recording pixel region R21 as the position of the recording pixel region R21. The ISP 4 can output the pixel positions of the two corners in the diagonal direction as the pixel position of the location representing the recording pixel region R21. For example, the ISP 4 may output the pixel position of the upper left corner CN11 and the pixel position of the lower right corner CN12 in FIG. 22B.

In the camera ECU 310, the CPU 311 receives the image (the output image) IM21 of the recording pixel region R21 and the position of the recording pixel region R21 from the vehicular camera 100 via the cable 320 and the decoder 312. The CPU 311 generates a display image to be output to the predetermined display device by using the image (the output image) IM21 of the recording pixel region R21 (S205).

The position of the distortion center DC is set in the camera ECU 310 in advance. The position of the distortion center DC corresponds to the pixel position of the distortion center DC in the image IM21. The CPU 311 may confirm that the center PC21 in the image IM21 substantially coincides with the distortion center DC according to the position of the recording pixel region R21 and the position of the distortion center DC. Accordingly, as illustrated in FIGS. 22B and 22C, the CPU 311 may generate a display image IM31 by using the image IM21 of the recording pixel region R21 as it is. The display image IM31 is an image having the distortion center DC as a center and the same number of pixels (for example, X2×Y2 illustrated in FIG. 19) as that of the recording pixel region R21.

If the image IM21 of the recording pixel region R21 is used as it is during the generation of the display image IM31, the CPU 311 can omit an arithmetic process (see FIG. 18C) for obtaining the image having the distortion center DC as the center and the same number of pixels as that of the recording pixel region R21. The CPU 311 can generate the display image IM31 while avoiding the occurrence of the partial region PR2 to be deleted (see FIG. 18C). The CPU 311 can generate the display image IM31 not including the partial region PR3 (see FIG. 18C) in which the image information is substantially missing. Accordingly, the image quality of the display image IM31 can be improved.

In the vehicular camera 100, the ISP 4 performs the predetermined process on the image IM21 and outputs the image IM21 of the recording pixel region R21 and the position of the distortion center DC while stabilizing the image IM21 (S18). The predetermined process includes an exposure adjustment, a white balance adjustment, a gain adjustment, a gamma correction, and the like.

In the camera ECU 310, the CPU 311 supplies the display image IM31 to the predetermined display device (for example, the display 202) in response to the stabilization of the image IM21 from the vehicular camera 100. The predetermined display device displays the display image IM31 (S106).

As described above, according to the second embodiment, the vehicular camera 100 reads the position of the recording pixel region R21 from the nonvolatile memory 305 in response to the activation of the image capturing element 303, and outputs the output image of the recording pixel region R21 as a part of the effective pixel region R1 and the position of the recording pixel region R21 to the camera ECU 310 via the cable 320. Accordingly, the output image can be transmitted to the camera ECU 310 via the cable 320 at the rate equal to or lower than the upper limit frequency Fth, and the predetermined frame rate required for the vehicular camera 100 can be satisfied. Further, since the position of the recording pixel region R21 is transmitted to the camera ECU 310 in addition to the output image, the camera ECU 310 can confirm that the center PC21 of the recording pixel region R21 is aligned with the distortion center DC, and the display image IM31 can be generated by using the image IM21 of the recording pixel region R21 as it is. As a result, the predetermined frame rate required for the vehicular camera 100 can be satisfied, and the display image in which the position of the distortion center DC is appropriate can be displayed on the predetermined display device (for example, the display 202).

Also in the embodiment described with reference to FIGS. 1A to 10, the vehicular camera is assembled, the position of the distortion center DC of the lens unit is measured, and the position of the distortion center DC is written in the nonvolatile memory according to the flowchart of FIG. 16 or FIG. 20. Further, the display image in which the position of the distortion center DC is appropriately adjusted can be displayed on the predetermined display device.

As described above, at least the following matters are described in the present disclosure. Components corresponding to those in the embodiments described above are shown in parentheses, but the present disclosure is not limited thereto.

(1) A vehicular camera (the vehicular camera 100), including:

a lens unit (the lens unit 30) including a first cylindrical portion (the first cylindrical portion 37) having a first cylindrical shape, at least one lens disposed inside the first cylindrical portion, and a flange portion (the flange portion 32) disposed outside the first cylindrical portion to extend outward with respect to an optical axis of the at least one lens over an entire periphery around the optical axis;

a circuit board (the circuit board 40) including a first surface (the first surface 40*a*) and a second surface (the second surface 40*b*) opposite to the first surface;

an image capturing element (the image capturing element 50) disposed on the optical axis of the lens and on the first surface of the circuit board;

a housing (the housing 60) including a second tubular portion (the large-diameter tubular portion 61) having a second tubular shape along the optical axis, and at least accommodating the circuit board and the image capturing element inside the second tubular portion; and a ring member (the ring member 20) having a flat plate shape and predetermined light transmissivity and welded to the flange portion of the lens unit and the second tubular portion of the housing, in which the ring member has a third surface (the third surface 20*a*) and a fourth surface (the fourth surface 20*b*) opposite to the third surface and facing the flange portion of the lens unit, the flange portion of the lens unit includes a welding rib (the welding rib 34) protruding toward the fourth surface of the ring member and disposed over the entire periphery around the optical axis, the fourth surface of the ring member is welded to the welding rib and is welded to an end surface (the end surface 63) of the second tubular portion of the housing, the welding rib includes a first portion (the first portion 35) and a second portion (the second portion 36) different from the first portion, and a first height at which the first portion protrudes from the flange portion along an optical axis direction is different from a second height at which the second portion protrudes from the flange portion along the optical axis direction.

Accordingly, in the vehicular camera, the welding rib protruding from the flange portion of the lens unit has the first portion and the second portion having different heights. Even when the flange portion of the lens unit is inclined with respect to the circuit board as the result of the adjustment of the lens unit, the ring member is welded to the welding rib of the flange portion in the state in which the ring member is not inclined with respect to the circuit board by the action of the welding rib. Specifically, the first portion and the second portion having different heights of the welding rib absorb the inclination of the flange portion with respect to the circuit board, and position the ring member to be parallel to the circuit board.

Therefore, the ring member is disposed to be parallel to the circuit board, and the housing is attached to the ring member in the state of being parallel to the optical axis. As a result, since the connector disposed over the inner side and the outer side of the housing is connected to the circuit board without being inclined, it is possible to restrain the deterioration of the transmission characteristics of the connector.

(2) The vehicular camera according to (1), in which a first cross section of the first portion and a second cross section of the second portion are provided in a cross section orthogonal to the third surface of the ring member and in a radial direction around the optical axis, and a first area of the first cross section of the first portion is different from a second area of the second cross section of the second portion.

Accordingly, in the vehicular camera, the ring member can be welded to the welding rib of the flange portion in the state in which the ring member is not inclined with respect to the circuit board by the first portion and the second portion having different cross-sectional areas.

(3) The vehicular camera according to (2), in which the first cross section of the first portion has a first quadrilateral shape, and the second cross section of the second portion has a second quadrilateral shape different from the first quadrilateral shape.

Accordingly, in the vehicular camera, the ring member can be stably welded to the welding rib of the flange portion in the state in which the ring member is not inclined with respect to the circuit board by the first portion and the second portion each having the cross section in the quadrilateral shape.

(4) The vehicular camera according to (1), in which a height of the welding rib protruding from the flange portion along the optical axis varies depending on a position on the entire periphery of the flange portion.

Accordingly, in the vehicular camera, the ring member can be welded to the welding rib of the flange portion in the state in which the ring member is not inclined with respect to the circuit board over the entire periphery of the flange portion by the welding rib whose height varies depending on the position on the entire periphery of the flange portion.

(5) The vehicular camera according to (1), further including:

a connector (the connector 80) that is disposed on a bottom surface (the bottom surface 65), which corresponds to the second surface of the circuit board, of the second tubular portion of the housing over the inside and the outside of the housing, and that is electrically connected to the second surface of the circuit board, in which in the flange portion of the lens unit, a first protrusion (the protrusion 38), a second protrusion (the protrusion 38), and a third protrusion (the protrusion 38) protruding from a second flange surface (the second flange surface 32*b*) opposite to a first flange surface (the first flange surface 32*a*) on which the welding rib is formed are fixed to the first surface of the circuit board.

Accordingly, in the vehicular camera, the connector can be stably connected to the circuit board, and the lens unit can be stably disposed on the circuit board by the at least three protrusions.

(6) The vehicular camera according to (5), in which a longitudinal direction of the connector is orthogonal to the second surface of the circuit board.

Accordingly, in the vehicular camera, since the connector is connected to the circuit board in the state of being orthogonal to the circuit board, the excellent transmission characteristics can be secured.

(7) The vehicular camera according to (5), in which one end of the second flange surface of the flange portion in the lens unit is separated from one end of the first surface of the circuit board by a predetermined distance in a direction along the optical axis, and the distance is 0.4 mm or less.

Accordingly, it is possible to easily achieve the state in which the ring member is not inclined with respect to the circuit board.

(8) The vehicular camera according to (5), in which the flange portion of the lens unit is inclined at a predetermined inclination angle with respect to the circuit board, and the inclination angle is 1.150 or less.

Accordingly, it is possible to easily achieve the state in which the ring member is not inclined with respect to the circuit board.

(9) The vehicular camera according to (5), in which the connector is a coaxial connector or an STQ connector.

Accordingly, in the vehicular camera, high-speed communication can be achieved.

(10) The vehicular camera according to (3), in which the first quadrilateral shape of the first portion of the welding rib includes a first side (the first side 35*a*) on a flange portion side and a second side (the second side 35*b*) that is opposed to the first side and is shorter than the first side, and the second quadrilateral shape of the second portion of the welding rib includes a third side (the third side 36*a*) on the flange portion side and a fourth side (the fourth side 36*b*) that is opposed to the third side and is shorter than the second side and the third side.

Accordingly, in the vehicular camera, the ring member can be stably welded to the welding rib of the flange portion in the state in which the ring member is not inclined with respect to the circuit board by the first portion and the second portion each having the cross section expanding toward the flange portion side.

(11) The vehicular camera according to (10), in which the first quadrilateral shape of the first cross section of the first portion in the welding rib includes a fifth side (the fifth side 35*c*) inclined with respect to a direction along the optical axis, and the second quadrilateral shape of the second cross section of the second portion in the welding rib includes a sixth side (the sixth side 36*c*) inclined with respect to the direction along the optical axis.

Accordingly, in the vehicular camera, the ring member can be stably welded to the welding rib of the flange portion in the state in which the ring member is not inclined with respect to the circuit board by the first portion and the second portion each having the inclined side.

(12) The vehicular camera according to (5), in which the first flange surface of the flange portion of the lens unit is inclined at a predetermined inclination angle with respect to the fourth surface of the ring member.

Accordingly, in the vehicular camera, although the first flange surface of the flange portion is inclined at the predetermined inclination angle with respect to the fourth surface of the ring member, the ring member can be welded to the welding rib of the flange portion in the state in which the ring member is not inclined with respect to the circuit board by the first portion and the second portion having different heights.

Although the embodiments have been described above with reference to the accompanying drawings, the present disclosure is not limited to such embodiments. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, the components in the embodiments described above may be combined freely in a range without deviating from the spirit of the invention.

INDUSTRIAL APPLICABILITY

The present disclosure is useful as a vehicular camera that can be manufactured at low cost and ensures excellent imaging performance.

What is claimed is:

1. A vehicular camera, comprising:

a lens unit including a first cylindrical portion having a first cylindrical shape, at least one lens disposed inside the first cylindrical portion, and a flange portion disposed outside the first cylindrical portion to extend outward with respect to an optical axis of the at least one lens over an entire periphery around the optical axis;

a circuit board including a first surface and a second surface opposite to the first surface;

an image capturing element disposed on the optical axis of the lens and on the first surface of the circuit board;

a housing including a second tubular portion having a second tubular shape along the optical axis, and at least accommodating the circuit board and the image capturing element inside the second tubular portion; and a ring member having a flat plate shape and predetermined light transmissivity and welded to the flange portion of the lens unit and the second tubular portion of the housing, wherein the ring member has a third surface and a fourth surface opposite to the third surface and facing the flange portion of the lens unit, the flange portion of the lens unit includes a welding rib protruding toward the fourth surface of the ring member and disposed over the entire periphery around the optical axis, the fourth surface of the ring member is welded to the welding rib and is welded to an end surface of the second tubular portion of the housing, the welding rib includes a first portion and a second portion different from the first portion, and a first height at which the first portion protrudes from the flange portion along an optical axis direction is different from a second height at which the second portion protrudes from the flange portion along the optical axis direction.

2. The vehicular camera according to claim 1, wherein a first cross section of the first portion and a second cross section of the second portion are provided in a cross section orthogonal to the third surface of the ring member and in a radial direction around the optical axis, and a first area of the first cross section of the first portion is different from a second area of the second cross section of the second portion.

3. The vehicular camera according to claim 2, wherein the first cross section of the first portion has a first quadrilateral shape, and the second cross section of the second portion has a second quadrilateral shape different from the first quadrilateral shape.

4. The vehicular camera according to claim 3, wherein the first quadrilateral shape of the first portion of the welding rib includes a first side on a flange portion side and a second side that is opposed to the first side and is shorter than the first side, and the second quadrilateral shape of the second portion of the welding rib includes a third side on the flange portion side and a fourth side that is opposed to the third side and is shorter than the second side and the third side.

5. The vehicular camera according to claim 4, wherein the first quadrilateral shape of the first cross section of the first portion in the welding rib includes a fifth side inclined with respect to a direction along the optical axis, and the second quadrilateral shape of the second cross section of the second portion in the welding rib includes a sixth side inclined with respect to the direction along the optical axis.

6. The vehicular camera according to claim 1, wherein a height of the welding rib protruding from the flange portion along the optical axis varies depending on a position on the entire periphery of the flange portion.

7. The vehicular camera according to claim 1, further comprising:

a connector that is disposed on a bottom surface, which corresponds to the second surface of the circuit board, of the second tubular portion of the housing over the inside and the outside of the housing, and that is electrically connected to the second surface of the circuit board, wherein in the flange portion of the lens unit, a first protrusion, a second protrusion, and a third protrusion protruding from a second flange surface opposite to a first flange surface on which the welding rib is formed are fixed to the first surface of the circuit board.

8. The vehicular camera according to claim 5, wherein a longitudinal direction of the connector is orthogonal to the second surface of the circuit board.

9. The vehicular camera according to claim 5, wherein one end of the second flange surface of the flange portion in the lens unit is separated from one end of the first surface of the circuit board by a predetermined distance in a direction along the optical axis, and the distance is 0.4 mm or less.

10. The vehicular camera according to claim 5, wherein the flange portion of the lens unit is inclined at a predetermined inclination angle with respect to the circuit board, and the inclination angle is 1.150 or less.

11. The vehicular camera according to claim 5, wherein the connector is a coaxial connector or an STQ connector.

12. The vehicular camera according to claim 5, wherein the first flange surface of the flange portion of the lens unit is inclined at a predetermined inclination angle with respect to the fourth surface of the ring member.

* * * * *